US012387658B2

(12) United States Patent
Knausz et al.

(10) Patent No.: US 12,387,658 B2
(45) Date of Patent: Aug. 12, 2025

(54) DISPLAY DIMMING FOR PULSE-WIDTH-MODULATION PIXEL CONTROL

(71) Applicant: X Display Company Technology Limited, Dublin (IE)

(72) Inventors: Imre Knausz, Fairport, NY (US); Ronald S. Cok, Rochester, NY (US)

(73) Assignee: X Display Company Technology Limited, Dublin (IE)

( * ) Notice: Subject to any disclaimer, the term of this patent is extended or adjusted under 35 U.S.C. 154(b) by 11 days.

(21) Appl. No.: 18/060,486

(22) Filed: Nov. 30, 2022

(65) Prior Publication Data

US 2024/0177649 A1 May 30, 2024

(51) Int. Cl.
*G09G 3/32* (2016.01)
*G09G 3/20* (2006.01)

(52) U.S. Cl.
CPC ............ *G09G 3/32* (2013.01); *G09G 3/2096* (2013.01); *G09G 3/2018* (2013.01); *G09G 2310/08* (2013.01); *G09G 2320/0626* (2013.01)

(58) Field of Classification Search
CPC ....... G09G 2320/0626; G09G 2310/08; G09G 3/2018; G09G 3/32; G09G 2300/0465; G09G 2320/062; G09G 3/2014; G09G 3/2944; G09G 3/2946
See application file for complete search history.

(56) References Cited

U.S. PATENT DOCUMENTS

| | | | |
|---|---|---|---|
| 7,622,367 | B1 | 11/2009 | Nuzzo et al. |
| 8,120,555 | B2 | 2/2012 | Cok |
| 8,506,867 | B2 | 8/2013 | Menard |
| 8,722,458 | B2 | 5/2014 | Rogers et al. |
| 8,889,485 | B2 | 11/2014 | Bower |
| 9,640,108 | B2 | 5/2017 | Cok et al. |
| 9,928,771 | B2 | 3/2018 | Cok |
| 10,157,563 | B2 | 12/2018 | Cok et al. |
| 10,360,846 | B2 | 7/2019 | Cok et al. |
| 10,388,205 | B2 | 8/2019 | Cok et al. |
| 10,823,609 | B2 | 11/2020 | Simeone |
| 11,430,375 | B1 | 8/2022 | Meitl et al. |
| 11,551,605 | B2 | 1/2023 | Kim et al. |
| 2009/0115703 | A1 | 5/2009 | Cok |

(Continued)

OTHER PUBLICATIONS

Cok, R. S. et. al., AMOLED displays with transfer-printed integrated circuits, Journal of SID, 19(4):335-341, (2011).

*Primary Examiner* — Robin J Mishler
(74) *Attorney, Agent, or Firm* — Choate, Hall & Stewart LLP; Michael D. Schmitt

(57) ABSTRACT

A system with dimming control includes a luminance signal, a variable-frequency-clock signal generator responsive to the luminance signal operable to generate a variable-frequency clock signal, a pixel-control signal generator responsive to the variable-frequency clock signal operable to generate a pixel-control signal, and a pixel including a light emitter responsive to the pixel-control signal. The pixel-control signal can be a temporally modulated signal such as a pulse-width modulation signal or a pulse-density modulation signal. A display can comprise an array of pixels and a display controller. The pixel or the display controller can include the variable-frequency clock signal or the pixel-control signal generator, or both.

21 Claims, 18 Drawing Sheets

(56) References Cited

U.S. PATENT DOCUMENTS

| | | | | |
|---|---|---|---|---|
| 2016/0093600 | A1 | 3/2016 | Bower et al. | |
| 2017/0061867 | A1 | 3/2017 | Cok et al. | |
| 2017/0330509 | A1 | 11/2017 | Cok et al. | |
| 2018/0197471 | A1 | 7/2018 | Rotzoll et al. | |
| 2019/0347980 | A1 | 11/2019 | Kuo et al. | |
| 2021/0210002 | A1 | 7/2021 | Kim et al. | |
| 2021/0366345 | A1* | 11/2021 | Tseng ................... | G09G 3/2007 |
| 2023/0154387 | A1* | 5/2023 | Lee ...................... | G09G 3/2022<br>345/55 |
| 2024/0071279 | A1* | 2/2024 | Knausz ................ | G09G 3/3233 |

* cited by examiner

Minimum Pulse Period = 1

PWM Pulse Periods

| 100% Lum | 50% Lum |
|---|---|
| 2 | 1 |
| 4 | 2 |
| 8 | 4 |

| CV | 100% Lum | 50%Lum |
|---|---|---|
| 0 | 0 | 0 |
| 1 | 2 | 1 |
| 2 | 4 | 2 |
| 3 | 6 | 3 |
| 4 | 8 | 4 |
| 5 | 10 | 5 |
| 6 | 12 | 6 |
| 7 | 14 | 7 |

Minimum Pulse Period = 1

PWM Pulse Periods

| 50% | 37.5% |
|---|---|
| 1 | 1 |
| 2 | 1.5 |
| 4 | 3 |

| CV | 50% | 37.5%* | 37.5%** |
|---|---|---|---|
| 0 | 0 | 0 | 0 |
| 1 | 1 | 0.75 | 1 |
| 2 | 2 | 1.5 | 1.5 |
| 3 | 3 | 2.25 | 2.5 |
| 4 | 4 | 3 | 3 |
| 5 | 5 | 3.75 | 4 |
| 6 | 6 | 4.5 | 4.5 |
| 7 | 7 | 5.25 | 5.5 |

* Desired

** Actual

Minimum Pulse Period = 1

PWM Pulse Periods

| 50% | 25% |
|---|---|
| 1 | 1 |
| 2 | 1 |
| 4 | 2 |

Code Values

| | 50% | 25%* | 25%** |
|---|---|---|---|
| 0 | 0 | 0 | 0 |
| 1 | 1 | 0.5 | 1 |
| 2 | 2 | 1 | 1 |
| 3 | 3 | 1.5 | 2 |
| 4 | 4 | 2 | 2 |
| 5 | 5 | 2.5 | 3 |
| 6 | 6 | 3 | 3 |
| 7 | 7 | 3.5 | 4 |

* Desired
** Actual

Minimum Pulse Period = 1

PWM Pulse Periods

| 50% | 25% | 12.5% |
|---|---|---|
| 1 | 1 | 1 |
| 2 | 1 | 1 |
| 4 | 2 | 1 |

Code Values

| | 50% | 25%* | 12.5%* | 12.5%** |
|---|---|---|---|---|
| 0 | 0 | 0 | 0 | 0 |
| 1 | 1 | 0.5 | 0.25 | 0 |
| 2 | 2 | 1 | 0.5 | 1 |
| 3 | 3 | 1.5 | 0.75 | 1 |
| 4 | 4 | 2 | 1 | 1 |
| 5 | 5 | 2.5 | 1.25 | 1 |
| 6 | 6 | 3 | 1.5 | 2 |
| 7 | 7 | 3.5 | 1.75 | 2 |

* Desired
** Actual

Minimum Pulse Period = 1
Image Frame = 14 MPP

PWM Pulse Periods

| 100% | 125% | 150% |
|---|---|---|
| 2 | 2.5 | 3 |
| 4 | 5 | 6 |
| 8 | 10 | 12 |

| CV | 100% | 125%* | 125%** | 150%* | 150%** |
|---|---|---|---|---|---|
| 0 | 0 | 0 | 0 | 0 | 0 |
| 1 | 2 | 2.5 | 2.5 | 3 | 3 |
| 2 | 4 | 5 | 5 | 6 | 6 |
| 3 | 6 | 7.5 | 7.5 | 9 | 9 |
| 4 | 8 | 10 | 10 | (15) | 12 |
| 5 | 10 | 12.5 | 12.5 | (18) | 14 |
| 6 | 12 | (15) | 14 | (21) | 14 |
| 7 | 14 | (17.5) | 14 | (24) | 14 |

* Desired
** Actual

DISPLAY DIMMING FOR PULSE-WIDTH-MODULATION PIXEL CONTROL

TECHNICAL FIELD

The present disclosure relates to light-emitting displays with pixel control circuits that use temporally variable constant-current control, such as pulse-width modulation, and provide dimming control.

BACKGROUND

Flat-panel displays are widely used to present images and information in graphic user interfaces controlled by computers. Such displays incorporate an array of light-controlling pixels. Each pixel emits or otherwise controls light. For example, liquid crystal displays control light emitted from a back light with a light-blocking liquid crystal at each pixel, organic light-emitting displays emit light from a stack of organic films, and inorganic light-emitting displays emit light from semiconductor crystals. In binary displays, each pixel controls light to be on at a desired luminance or off at a zero luminance. More commonly, pixels control light over a range of luminances, from off to a maximum designed luminance. The number of distinct luminance levels in a display pixel can be referred to as the gray scale and is defined as a bit depth for a computer-controlled display, for example an eight-bit gray-scale range having 256 different luminance levels or a twelve-bit gray-scale range having 4096 different luminance levels. In general, a greater luminance range is preferred to display images with more shades of light and dark in a color or color combination such as white with reduced contouring.

Portable displays can be used in a wide variety of ambient luminance environments, such as in a dark room or outdoors on a sunny day. The human visual system can adapt to such different ambient luminance environments by increasing or reducing the amount of light admitted to the eye so that a given display at a specific luminance can appear bright when viewed in a dark environment and dim when viewed in a bright environment. To achieve a consistent appearance to the human visual system, a display must have a lesser luminance in a dark environment and a greater luminance in a bright environment. Thus, to be useful in such a wide range of dark and bright environments, a display can benefit from a very wide dynamic range as well as many distinct luminance levels.

Depending on the pixel light-control technology, the luminance of a pixel can be controlled by, for example, driving a pixel over a range of voltages, over a range of currents, or at a constant power (e.g., at a given voltage and current) for a variable amount of time. Pixels that control light with variable time periods can use pulse-width or pulse-density modulation techniques that assign each bit of a multi-bit pixel value to one or more time periods having a total temporal length corresponding to the relative value of the bit in the multi-bit pixel. For example, in a four-bit pixel, the least significant bit can have a temporal period equal to one minimum period and the most significant bit can have a temporal period equal to eight minimum periods. However, in practical implementations, the minimum period can have a value that is limited by the electronic circuits driving the pixels, thereby limiting the luminance range and gray scale of pixels in a display at a given image frame rate.

There is a need, therefore, for pixel control circuits in displays using temporal modulation that provide improved gray-scale bit depth, image frame rates, and dynamic range.

SUMMARY

According to some embodiments of the present disclosure, among other embodiments, pixel control circuits in displays can use temporal modulation with a constant power, for example pulse-width or pulse-density modulation with a constant current when turned on, to provide improved gray-scale bit depth, image frame rates, and dynamic range with dimming control that can control the temporal periods of a pulse-width modulation pixel signal.

According to embodiments of the present disclosure, a system with dimming control comprises a variable-frequency-clock signal generator responsive to a luminance signal operable to generate a variable-frequency clock signal, a pixel-control signal generator responsive to the variable-frequency clock signal operable to generate a temporally modulated pixel-control signal, and a pixel comprising a light controller (e.g., a light emitter) responsive to the pixel-control signal. In embodiments, the variable-frequency-clock signal generator is operable to change a frequency or period of the variable-frequency clock signal in response to the luminance signal. The variable-frequency-clock signal generator can be operable to increase the frequency of the variable-frequency clock signal in response to the luminance signal to reduce luminance of the light controller and the variable-frequency-clock signal generator can decrease the frequency of the variable-frequency clock signal in response to the luminance signal to increase luminance of the light controller.

Some embodiments comprise an array of pixels, each of the pixels comprising a light controller responsive to a pixel-control signal from a pixel-control signal generator. Some embodiments comprise a display controller and the display controller comprises the variable-frequency-clock signal generator and the pixel-control signal generator and provides the pixel-control signal to the pixel. Some embodiments comprise a display controller, the display controller comprises the variable-frequency-clock signal generator and provides the variable-frequency clock signal to the pixel and the pixel is operable to receive the variable-frequency clock signal and generate the pixel-control signal in response to the variable-frequency clock signal. Some embodiments comprise a display controller, and the display controller provides the luminance signal to the pixel and the pixel is operable to receive the luminance signal, generate the variable-frequency clock signal in response to the luminance signal, and generate the pixel-control signal in response to the variable-frequency clock signal.

According to some embodiments, the system is operable to display a specified luminance with the light controller in a frame period, the luminance signal is a percent of the frame period, the pixel-control signal has a variable pixel period, and the variable pixel period is equal to the luminance signal times the frame period but no greater than the frame period and no less than a minimum pulse period determined by the system.

According to some embodiments, the pixel comprises multiple light controllers and the system provides each of the light controllers with a different variable pixel period.

In some embodiments, the temporally modulated signal is a constant-current time-modulation signal comprising pulse periods. In some embodiments, the pulse periods correspond to binary-weighted bits that specify a pixel value corresponding to a desired light-emitter luminance.

Some embodiments comprise a frame period. In some embodiments, (i) the binary-weighted bits comprise N bits, (ii) each pulse period has a relative temporal duration corresponding to a relative value of a different bit of the binary-weighted bits, and (iii) a least-significant-bit pulse period has a temporal duration equal to the (frame period times the luminance signal)/($2^N$−1). In some embodiments, (i) the binary-weighted bits comprise N bits and (ii) each of the pulse periods has a relative temporal duration equal to a (frame period times the luminance signal) divided by the pixel value.

A minimum pulse period can be greater than the least-significant-bit pulse period. Some embodiments comprise a frame period and (i) the binary-weighted bits comprise N bits, (ii) each pulse period has a relative temporal duration equal to the (frame period times the luminance signal) divided by the pixel value. In some embodiments, a minimum pulse period is no greater than the least-significant-bit pulse period and all of the pulse periods have temporal durations that are substantially equal. In some embodiments, a minimum pulse period is no greater than the least-significant-bit pulse period and at least two of the pulse periods have temporal durations that are substantially different and are not a relative power of two.

In some embodiments, the pixel is operable to control the light emitter at a constant current during each of the pulse periods.

According to embodiments of the present disclosure, a display with dimming control comprises a system comprising an array of pixels responsive to the pixel-control signal and a display controller operable to receive or generate the luminance signal for each of the pixels. The display controller can be operable to (i) provide the luminance signal to each of the pixels in the array of pixels, (ii) provide the variable-frequency clock signal to each of the pixels in the array of pixels, or (iii) provide the pixel-control signal to each of the pixels in the array of pixels. In some embodiments, the display controller is operable to (i) provide different luminance signals to one or more pixel groups of pixels in the array of pixels, (ii) provide different variable-frequency clock signals to one or more pixel groups of pixels in the array of pixels, or (iii) provide different pixel-control signals having different pixel periods to one or more pixel groups of pixels in the array of pixels. In some embodiments, the array of pixels comprises rows of pixels and columns of pixels, the variable-frequency signal is provided on row wires to rows of pixels, pixel values are provided on column wires to columns of pixels, and the variable-frequency signal is a pulse-width modulation signal. The variable-frequency signal can have a constant frequency and the variation responsive to the luminance signal can be the frequency. The variable-frequency signal can have a constant pixel period and the variation responsive to the luminance signal can be the temporal duration of the pixel period.

According to embodiments of the present disclosure, a method of operating a pixel with dimming control comprises receiving a first luminance signal, receiving a clock signal, generating a first variable-frequency clock signal responsive to the first luminance signal and the clock signal, receiving a second luminance signal different from the first luminance signal, generating a second variable-frequency clock signal responsive to the second luminance signal and the clock signal. If a luminance corresponding to the first luminance signal is greater than a luminance corresponding to the second luminance signal, a frequency of the first variable-frequency clock signal can be less than a frequency of the second variable-frequency clock signal. If a luminance corresponding to the first luminance signal is less than a luminance corresponding to the second luminance signal, a frequency of the first variable-frequency clock signal can be greater than the frequency of the second variable-frequency clock signal.

In some embodiments of the present disclosure, a method of operating a pixel comprises receiving a luminance signal, generating a variable-frequency clock signal based on the luminance signal, generating a pixel-control signal based on the variable-frequency clock signal, wherein the pixel-control signal is a temporally modulated signal, and driving a light controller using the pixel-control signal. Some methods of the present disclosure comprise changing a frequency of the variable-frequency clock signal in response to the luminance signal. Some methods of the present disclosure comprise increasing a frequency of the variable-frequency clock signal in response to the luminance signal to reduce luminance of the light controller and decreasing a frequency of the variable-frequency clock signal in response to the luminance signal to increase luminance of the light controller.

In some embodiments of the present disclosure, a display controller provides the luminance signal to a variable-frequency-clock signal generator and the variable-frequency-clock signal generator receives the luminance signal and generates the variable-frequency clock signal.

Some methods of the present disclosure comprise displaying a specified luminance with the light controller in a frame period, wherein the luminance signal is a percent of the frame period, the pixel-control signal has a variable pixel period, and the variable pixel period is equal to the luminance signal times the frame period but no greater than the frame period and no less than a minimum pulse period determined by the system. In some embodiments, the temporally modulated signal is a constant-current time-modulation signal comprising pulse periods. In some embodiments, the pulse periods correspond to binary-weighted bits that specify a pixel value corresponding to a desired light-emitter luminance.

In some methods of the present disclosure (i) the binary-weighted bits comprise N bits, (ii) each pulse period has a relative temporal duration corresponding to a relative value of a different bit of the binary-weighted bits, and (iii) a least-significant-bit pulse period has a temporal duration equal to a (frame period times the luminance signal)/($2^N$−1). In some methods, a minimum pulse period is greater than the least-significant-bit pulse period. In some methods, a minimum pulse period is no greater than the least-significant-bit pulse period and all of the pulse periods have temporal durations that are substantially equal. In some methods, a minimum pulse period is no greater than the least-significant-bit pulse period and at least two of the pulse periods have temporal durations that are substantially different and are not a relative power of two.

In some methods, (i) the binary-weighted bits comprise N bits and (ii) each of the pulse periods has a relative temporal duration equal to a (frame period times the luminance signal) divided by the pixel value. In some methods, the pixel is operable to control the light emitter at a constant current during each of the pulse periods. Certain embodiments of the present disclosure provide a control circuit for temporally modulated pixels in a display that provide improved gray-scale resolution and dimming control. Control circuits disclosed herein are suitable for inorganic micro-light-emitting diodes and can be applied in an array of pixels in a display.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which.

Figure 1:
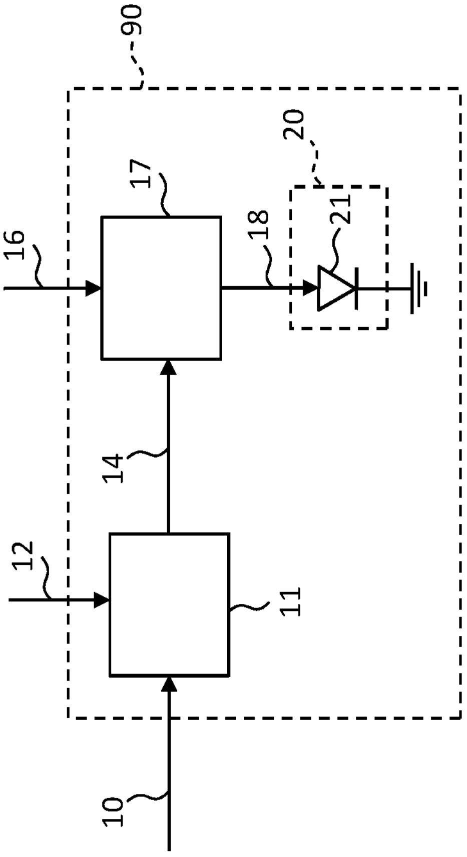
FIG. 1 is a schematic of a system with dimming control according to illustrative embodiments of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF CERTAIN EMBODIMENTS

Certain embodiments of the present disclosure provide systems and displays comprising one or more temporally modulated pixels with dimming control and no loss of gray-scale resolution at a given image frame rate useful in a display. The pixels can operate at a constant current using pulse-width modulation or pulse-density modulation to control a light controller, for example a light emitter such as an inorganic micro-light-emitting diode. A display can comprise an array of the pixels.

Pixel circuits can have a limited frequency capability, for example a minimum switching period or maximum switching frequency that defines the shortest controllable temporal pulse received or provided by the pixel circuits. This minimum temporal period limits the minimum amount of time that a light controller controlled by the pixel circuit in a pixel can controllably emit light and is referred to herein as a minimum pulse period. This limitation also specifies the maximum frame rate (the minimum frame period) for a display comprising an array of such pixels with a determined temporal control signal, for example the number of bits in a pulse-width-modulation signal. For pixels controlled by temporally modulated signals such as pulse-width-modulation (PWM) signals or pulse-density-modulation (PDM) signals having pulse periods during which light controllers emit light, the smallest pulse period is likewise limited by the shortest controllable temporal pulse and therefore limits the number of different temporally modulated signal values possible in a given period of time (e.g., a PWM signal in an image frame period) and therefore the gray-scale resolution of the pixel. Thus, there is an inherent limit to the image frame rate and gray-scale resolution that can be supported by a pixel circuit defined by the hardware implementation of the pixel and display.

The minimum temporal control period in a pixel circuit might be limited, for example, by the slew rate of an electronic input or output signal, control signal, or driving transistor, by the parasitic resistance, capacitance, or inductance of control signal wires or driving wires, by the pixel circuit's ability to drive or respond to a desired amount of current at a given voltage, or by the pixel circuit's ability to drive or respond to a desired voltage at a given current. For example, if a minimum temporal control period is five hundred nanoseconds and an eight-bit PWM signal is used to control a pixel, the maximum frame rate for a pixel is 255*0.0000005=0.000128 seconds or almost 8000 frames per second. If a twelve-bit signal PWM signal is used with a minimum temporal control period of fifty microseconds, the maximum frame rate for a pixel is about five image frames per second. Contemporary displays can operate at frame rates of up to 480 frames per second (or more) with gray-scale resolutions of twelve bits (4096 levels) or more. In some displays, even greater gray-scale resolutions, for example sixteen or twenty bits, and frame rates, for example 960 frames per second or more can be desired.

The electronic circuits available in some displays can have relatively large and slow transistors (e.g., in thin-film transistor circuits coated on a display substrate). More complex circuits and faster-switching materials can operate at higher frequencies and provide more power at higher voltages but can be more expensive or impractical for a given display. There is, therefore, a need for pixel circuits, in particular digital pixel-control circuits, that can provide improvements in frame rate and gray-scale resolution without requiring expensive and complex control circuits.

Micro-light-emitting diodes (micro-LEDs) provide electrically and optically efficient light output with excellent color saturation and are therefore desirable light emitters in a display. Such micro-LEDs can operate most efficiently at a given constant current and are therefore advantageously operated at the given constant current using temporally modulated signals such as pulse-width modulation or pulse-density modulation. Embodiments of the present disclosure provide efficient and simple systems, circuits, devices, and methods for operating a pixel at a constant current using temporal modulation with dimming control and without loss of gray-scale resolution. Systems, circuits, devices, and methods of the present disclosure can also provide extended dimming control with some reduction in gray scale for pixel luminance, for example where temporally controlled luminance is limited by a minimum temporal pulse length or frame rate.

According to embodiments of the present disclosure and as illustrated in FIG. 1, a system 90 with dimming control can comprise a luminance signal 12, a variable-frequency-clock signal generator 11 responsive to luminance signal 12 operable to generate a variable-frequency clock signal 14, a pixel-control signal generator 17 responsive to variable-frequency clock signal 14 operable to generate a pixel-control signal 18, and a pixel 20 comprising a light emitter 21 responsive to pixel-control signal 18. Pixel-control signal 18 can be a temporally modulated signal, for example a pulse-width-modulation signal or a pulse-density-modulation signal that provides a constant current for pulse periods and is therefore a constant-current time-modulation signal. The constant current can be zero when light emitter 21 emits no light or can be a pre-determined non-zero current to emit light at a pre-determined luminance, for example selected to operate light emitter 21 at a desired electro-optical efficiency. In the Figures, for illustrative clarity, a signal and the wire(s) carrying the signal are not distinguished.

Light emitter 21 can be a light-emitting diode (LED) such as a micro-light-emitting diode formed in a compound semiconductor. Pixel-control signal generator 17 and variable-frequency-clock signal generator 11 can comprise analog circuit elements, digital circuit elements, or comprise a mixed-signal circuit comprising both analog and digital circuit elements made in a suitable semiconductor such as silicon or a compound semiconductor using photolithographic methods and materials. Either or both pixel-control signal generator 17 and variable-frequency-clock signal generator 11 can be integrated circuits or can be provided in a common integrated circuit. The integrated circuit and light emitter 21 can each be a bare unpackaged die assembled by micro-transfer printing and, in some embodiments, can comprise broken or separated tethers in consequence. In some embodiments, the integrated circuit is a silicon circuit on which light emitter 21 is disposed and to which light emitter 21 is electrically connected, for example using photolithographic methods and materials.

Variable-frequency-clock signal generator 11 can also receive or generate a clock signal 10, for example a clock operating at a desired fixed frequency from which variable-frequency clock signal 14 can be derived in response to luminance signal 12. Variable-frequency clock signal 14 can change frequency in response to luminance signal 12. Pixel-control signal generator 17 can also receive a pixel value 16, for example representing a desired relative luminance of light emitter 21 and can be a digital or analog value. For example, in a digital eight-bit system, pixel value 16 can be a value from 0 to 255 and in a twelve-bit system a value from 0 to 4095. Luminance signal 12 can be a dimming signal that indicates percent values greater than, equal to, or less than 100% and can be any suitable digital or analog signal that represents a desired percent output of a light output from light emitter 21 at a given pixel value 16, for example 150%, 125%, 75%, 50%, 25% or 12.5%. In some embodiments, variable-frequency clock signal 14 increases in frequency in response to luminance signal 12 to reduce light emitter 21 luminance (e.g., luminance signal 12 has a value less than 100%) and variable-frequency clock signal 14 decreases in frequency in response to luminance signal 12 to increase light emitter 21 luminance (e.g., luminance signal 12 has a value greater than 100%).

Figure 2A:
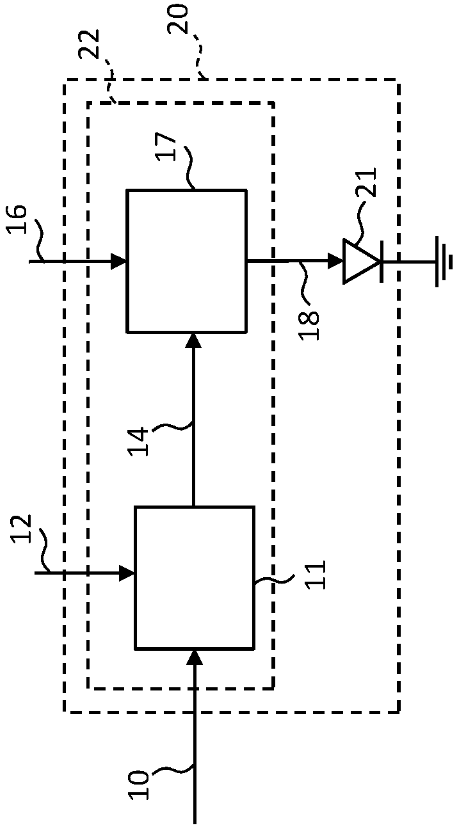
FIG. 2A is a schematic of a system with dimming control comprising a pixel with a pixel controller including a variable-frequency-clock signal generator and a pixel-control signal generator according to illustrative embodiments of the present disclosure.
Figure 2B:
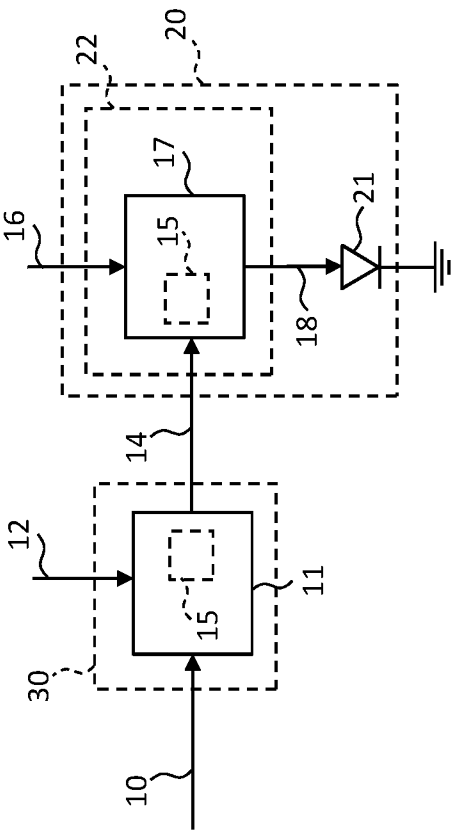
FIG. 2B is a schematic of a system with dimming control comprising a display controller including a variable-frequency-clock signal generator and a pixel including a pixel controller with a pixel-control signal generator according to illustrative embodiments of the present disclosure.
Figure 2C:
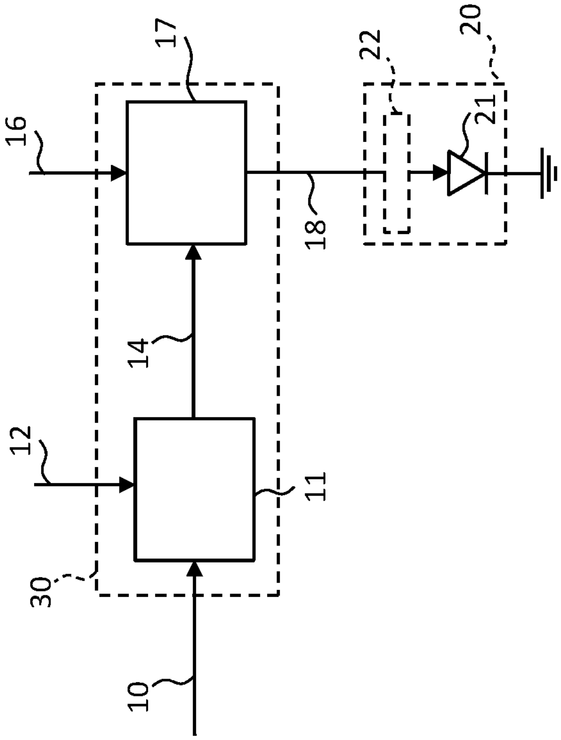
FIG. 2C is a schematic of a system with dimming control comprising a display controller including a variable-frequency-clock signal generator and a pixel-control signal generator according to illustrative embodiments of the present disclosure.

As illustrated in FIGS. 2A-2C, light emitter 21, pixel-control signal generator 17, and variable-frequency-clock signal generator 11 can be included in different system 90 components. As shown in FIG. 2A, pixel 20 comprises both variable-frequency-clock signal generator 11 and pixel-control signal generator 17 and receives luminance signal 12, clock signal 10, and pixel value 16. Pixel 20 can comprise a pixel controller 22 comprising variable-frequency-clock signal generator 11 and pixel-control signal generator 17.

As shown in FIG. 2B, pixel 20 comprises a pixel controller 22 comprising pixel-control signal generator 17 and system 90 comprises a display controller 30 separate from pixel 20 that comprises variable-frequency-clock signal generator 11. Display controller 30 can transmit variable-frequency clock signal 14 to pixel 20 and pixel controller 22. If pixel-control signal 18 is a pulse-width modulation (PWM) signal, a PWM signal can be generated from variable-frequency-clock signal 14 and the generation circuit (e.g., a digital or analog circuit) can be disposed in variable-frequency-clock signal generator 11 or in pixel-control signal generator 17 and therefore in either pixel controller 22 or display controller 30.

As shown in FIG. 2C, system 90 comprises a display controller 30 separate from pixel 20 that comprises variable-frequency-clock signal generator 11 and pixel-control signal generator 17. Display controller 30 can transmit pixel-control signal 18 to pixel 20. Optionally, pixel 20 can comprise pixel controller 22 to operate light emitter 21 as desired. Thus, pixel 20, light emitter 21, pixel controller 22, display controller 30, variable-frequency-clock signal generator 11, and pixel-control signal generator 17 can be disposed in various circuit or system 90 elements as will be appreciated by those knowledgeable in circuit design and embodiments of the present disclosure are not limited by specific implementations of the circuits described.

Variable-frequency clock signal 14 can have a variety of forms. In some embodiments, variable-frequency clock signal 14 is a regular signal having a consistent frequency responsive to luminance signal 12. From this frequency, pixel-control signal generator 17 can generate pixel-control signal 18. If pixel-control signal 18 is a pulse-width modulation signal, for example, pixel controller 22 can comprise a counter that generates pulses for each pulse period 42 corresponding to pixel value 16. In some embodiments, variable-frequency clock signal 14 is a pulse-width modulation signal having pulse periods 42 that have relative temporal durations that are successive powers of two. Pixel period 44 of the pulse-width modulation signal is responsive to luminance signal 12. In such embodiments, pixel-control signal generator 17 (e.g., in pixel controller 22) can combine the pulse-width modulation signal with pixel value 16 to provide the appropriate pixel-control signal 18, for example by turning pulse periods 42 of the pulse-width modulation signal on (setting it to a logical value of one to provide a non-zero voltage and current to light controller 21) or off (setting it to a logical value of zero to provide a voltage and current of zero to light controller 21). Thus, variable-frequency-clock signal generator 11 comprises the pulse-width modulation counter and it is not necessary to provide the pulse-width modulation counter in each pixel 20, reducing the total amount of hardware in system 90, for example as shown in FIG. 2B.

Figure 3A:
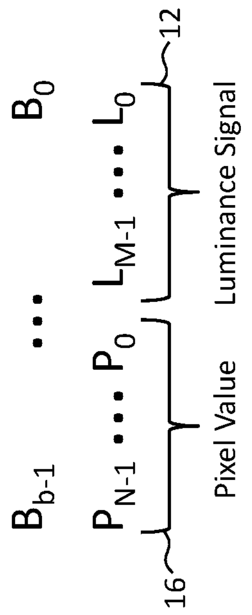
FIG. 3A is a bit format diagram according to illustrative embodiments of the present disclosure.

FIG. 3A illustrates a generic pixel value 16 P having N bits specifying a desired relative brightness of light emitter 21 and luminance signal 12 L having M bits specifying a desired dimming control value. The two values can be combined into a single bit stream B with b bits as shown and provided to pixel 20 (for example as shown in FIG. 2A) or to display controller 30 (as shown in FIG. 2C). In some embodiments, pixel value 16 can be provided separately from luminance signal 12 (for example for embodiments such as those of FIG. 2B).

Figure 3B:
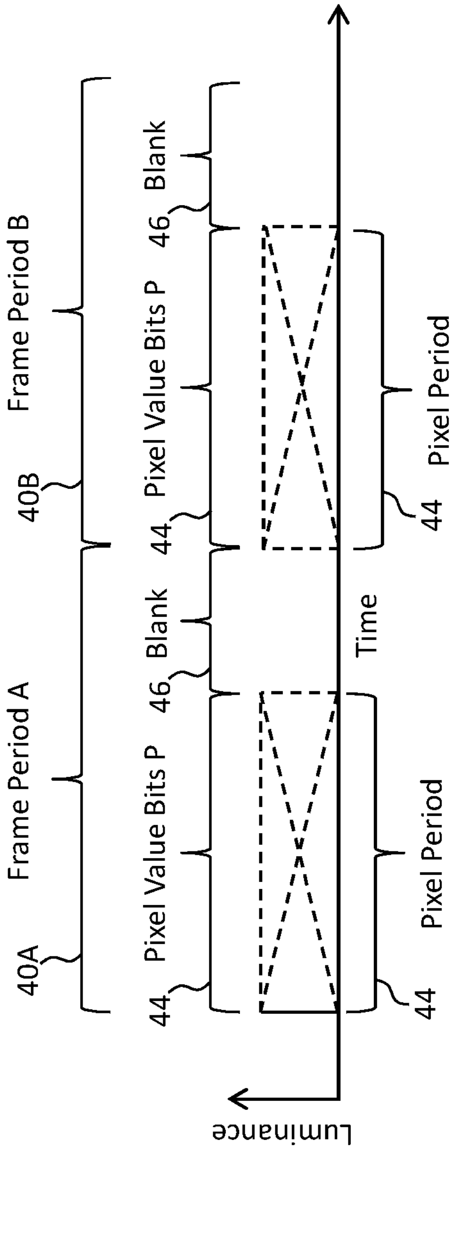
FIG. 3B is a bit timing diagram according to illustrative embodiments of the present disclosure.

FIG. 3B is a generic timing diagram for a given pixel value 16 and luminance signal 12. In embodiments, system 90 receives successive pixel values 16, for example a pixel value 16 for each pixel 20 in an image display in successive image frames. The pixel values 16 are displayed (e.g., a luminance corresponding to each pixel value 16 is output by light emitter 21 of corresponding pixel 20) for a pre-determined frame period 40 (e.g., for an image frame time). Successive frames of pixel values 16 are displayed for successive frame periods 40, labeled A and B in FIG. 3B. In first frame period 40A, a first pixel value 16 is displayed in a pixel period 44 and in second frame period 40B a second pixel value 16 is displayed in a second pixel period 44. Pixel values 16 in each frame period 40 can be different but have the same pixel period 44 if they have the same luminance signal 12. Pixel period 44 and pixel value 16 are mathematically unrelated. Pixel period 44 is the amount of time required to output the pixel value 16 and does not change regardless of pixel value 16. Likewise, pixel value 16 does not change for different pixel periods 44.

Figure 6A:
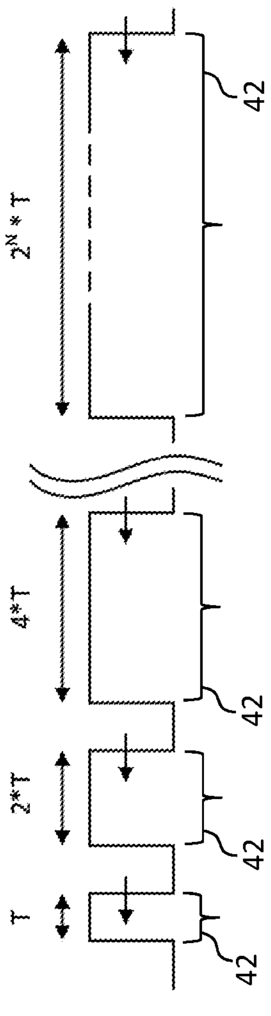
FIGS. 6A and 6B are bit timing diagrams for a pulse-width-modulation signal according to illustrative embodiments of the present disclosure.
Figure 6B:
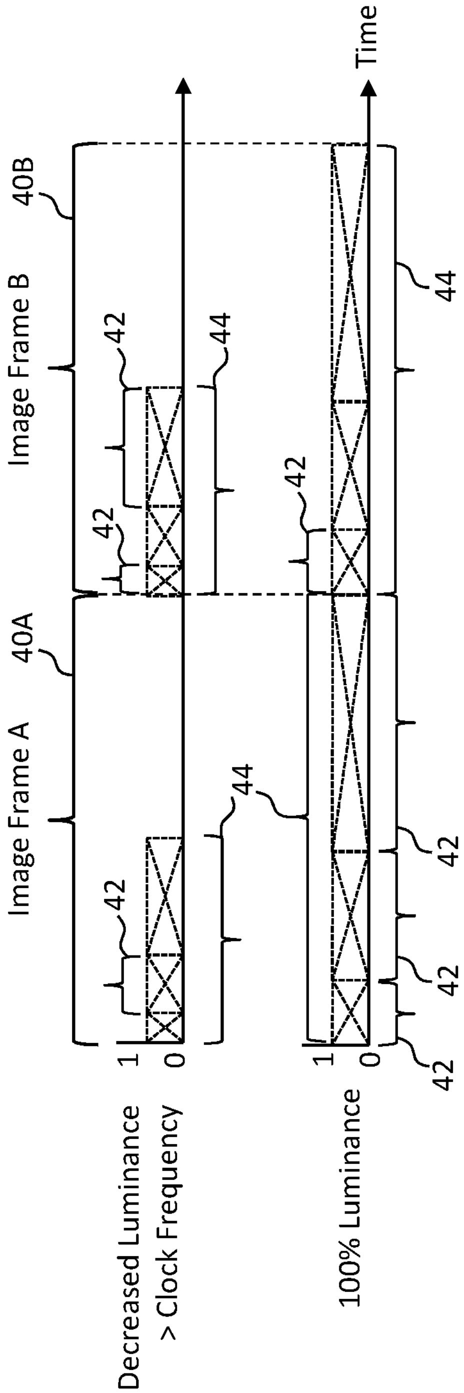

According to embodiments of the present disclosure, pixel values 16 are converted into pixel-control signals 18 that are temporally modulated signals for a pixel period 44 comprising pulse periods 42, shown in FIGS. 6A and 6B. Each pulse period 42 represents a temporal period (a period of time) in which light emitter 21 is turned on or off depending on pixel-control signal 18 and pixel value 16. Pixel periods 44 are shown with an X to show that each pulse period 42 can be a zero (e.g., off), or one, (e.g., on). Pulse-control signal generator 17 converts pixel value 16 to pulse periods 42 of pixel-control signal 18, responsive to variable-frequency clock signal 14. The sum of the pulse periods 42 for a pixel value 16 equals pixel period 44. In a conventional temporal modulation system, a temporal duration of pixel period 44 equals a temporal duration of frame period 40 so that there is no blank time (blank period 46). However, according to embodiments of the present disclosure, pixel period 44 is modified in response to luminance signal 12 and variable-frequency clock signal 14 so that portions of frame period 40 can be blank corresponding to the value of luminance signal 12 (e.g., no light is output during blank period 46 regardless of pixel value 16). Thus, pixel period 44 and blank period 46 are variable in response to different luminance signals 12. If, for example, luminance signal 12 is 50%, the blank period 46 time of each frame period 40 can likewise be 50% and pixel period 44 can be 50% of frame period 40. In embodiments of the present disclosure, frame periods 40 are sufficiently short that flicker is not observable by a human observer of system 90.

In embodiments of the present disclosure, system 90 can be operable to display a specified luminance in a pixel 20 light emitter 21 during a frame period 40, luminance signal 12 can be a percent of frame period 40, pixel-control signal 18 can have a variable pixel period 44, and variable pixel period 44 is equal to luminance signal 12 times frame period 40. Pixel period 44 can be equal to the sum of pulse periods 42. The actual amount of light output by light emitters 21 during a frame period 40 (integrated light output over time) is determined by pixel value 16, pixel period 44, and the constant current provided to light emitters 21 during pulse periods 42 and light emitters 21 light output in response to the constant current. If pixel period 44 and frame periods 40 are sufficiently short, the integrated light output will appear to the human visual system as a uniform light output during frame period 40. If luminance signal 12 is relatively larger, pixel period 44 is relatively longer and light emitters 21 will emit more light during frame period 40 so that pixel 20 will appear brighter with increased luminance. If luminance signal 12 is relatively smaller, pixel period 44 is relatively shorter and light emitters 21 will emit less light during frame period 40 so that pixel 20 will appear dimmer with reduced luminance.

Figure 4:
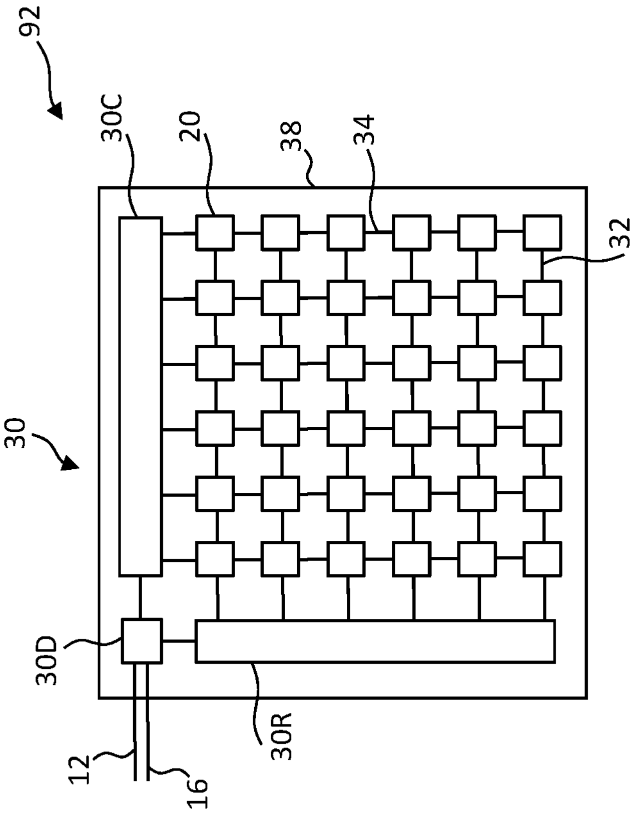
FIG. 4 is a schematic of a display with dimming control according to illustrative embodiments of the present disclosure.

FIG. 4 illustrates a display 92 with dimming control comprising an array of pixels 20 comprising light emitters 21 with dimming control controlled by display controller 30 (for example comprising a row controller 30R, column controller 30C, and central controller 30D) transmitting signals (e.g., luminance signal 12, variable-frequency clock signal 14, or pixel-control signal 18, or pixel value 16 depending on the system structure as shown in FIGS. 2A-2C) to pixels 20 connected to row wires 32 and column wires 34. Each pixel 20 can receive or be responsive to a different pixel value 16. Signals can be transmitted on row wires 32 and column wires 34, for example using an active-matrix control method. In some embodiments, pixel values 16 are provided on column wires 34 and variable-frequency clock signal 14 is provided on row wires 32, for example as shown in FIG. 2B.

Figure 5:
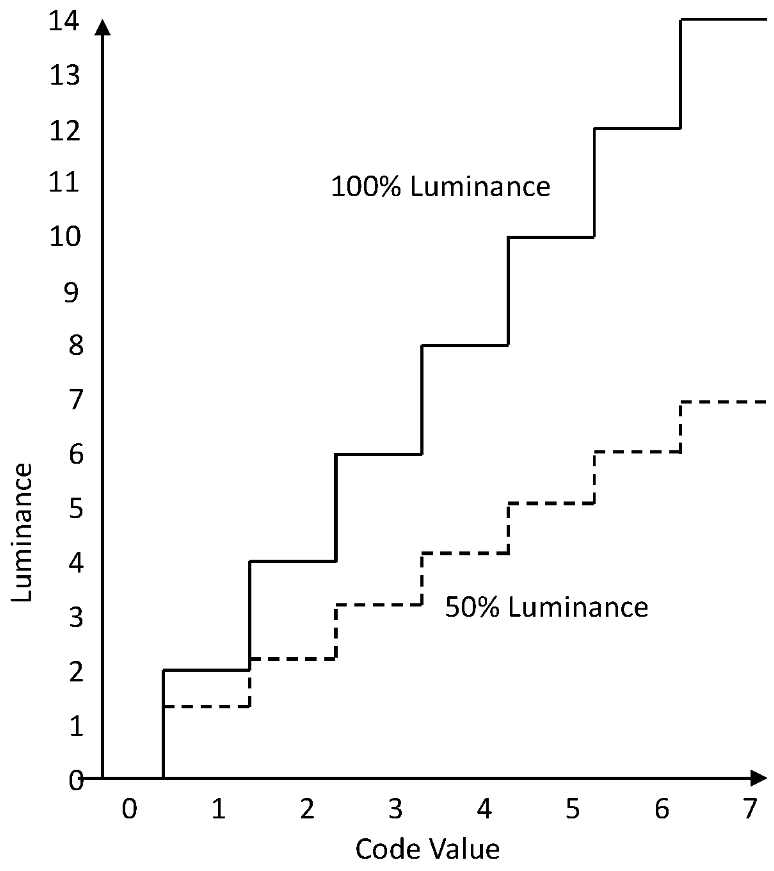
FIG. 5 is a code value table and luminance diagram according to illustrative embodiments of the present disclosure.

FIGS. 5-6B illustrates, for example, embodiments of the present disclosure having a luminance signal 12 of 50% (that is the luminance of display 92 is reduced by 50%, regardless of pixel values 16) so that pixel period 44 is 50% of frame period 40. In the embodiments of FIGS. 5-6B, pixel-control signal 18 is a pulse-width modulation signal with pulse periods 42 that are binary-weighted temporal periods. Each pulse period 42 corresponds to the relative value of a bit of pixel value 16 so that the N pulse periods 42 for an N-bit pixel value 16 have a relative temporal duration (period) of $2^{(N-1)}$. The least-significant bit of N-bit pixel value 16 corresponds to a least-significant-bit pulse period 42. The absolute temporal durations of the pulse periods 42 sum to frame period 40 times luminance signal 12 (e.g., pixel period 44). In the example shown, a minimum pulse period 43 (the shortest possible pulse period 42) is one in relative temporal units, frame period 40 is fourteen, and the number of bits in pixel value 16 is three. FIG. 5 illustrates the relative luminance of light emitter 21 of pixel 20 for two values of luminance signal 12. In the first case, luminance signal 12 is 100% so that pixel period 44 equals frame period 40:

fourteen. Pulse periods 42 are then two, four, and eight in temporal length, summing to fourteen. In the second case, luminance signal 12 is 50% so that pixel period 44 equals one half of frame period 40: seven. Pulse periods 42 are then one, two, and four, summing to seven. The net luminance for each pixel value 16 (code value or CV equal to zero to seven for a three-bit pixel value 16 is listed for each of the 100% and 50% cases. The different pulse periods 42 are turned on or off (corresponding to a zero current or a pre-determined current) corresponding to each pixel value 16 to provide a linear increase in time during which light emitter 21 is turned on corresponding to a linear increase in pixel value 16.

For example, in the 100% luminance signal 12 case, a pixel value 16 equal to zero corresponds to pulse periods 42 two, four, and eight (pulse periods 42 having a relative temporal duration of two, four, and eight) turned off, a pixel value 16 equal to one corresponds to pulse period 42 two turned on and pulse periods 42 four and eight turned off, a pixel value 16 equal to two corresponds to pulse period 42 four turned on and pulse periods 42 two and eight turned off, a pixel value 16 equal to three corresponds to pulse periods 42 two and four turned on and pulse period 42 eight turned off, a pixel value 16 equal to four corresponds to pulse period 42 eight turned on and pulse periods 42 two and four turned off, a pixel value 16 equal to five corresponds to pulse periods 42 two and eight turned on and pulse period 42 four turned off, a pixel value 16 equal to six corresponds to pulse periods 42 four and eight turned on and pulse period 42 two turned off, and a pixel value 16 equal to seven corresponds to pulse periods 42 two, four, and eight turned on. Pulse periods 42 for the 50% case are similar except that pulse periods 42 are one, two, and four rather than two, four, and eight (e.g., equal to 50% of the 100% pulse periods 42). FIG. 5 illustrates the effective luminance of the 100% and 50% cases integrated over pixel period 44 and frame period 40.

As shown in FIG. 6A, shorter pulse periods 42 can be provided by reducing the temporal length of pulse periods 42. As shown in FIG. 1, variable-frequency-clock signal generator 11 can provide variable-frequency clock signal 14 in response to luminance signal 12. If luminance signal 12 indicates a value less than one, variable-frequency-clock signal generator 11 can increase the frequency of variable-frequency clock signal 14. Pixel-control signal generator 17 can provide pixel-control signal 18 in response to the increased frequency of variable-frequency clock signal 14. If, as discussed below, pixel-control signal generator 17 employs a counter responsive to variable-frequency clock signal 14 to generate pulse periods 42 for pixel-control signal 18, generated pulse periods 42 will be temporally shorter because the counter will count faster in response to an increase in frequency of variable-frequency clock signal 14. Thus, pixel period 44 will be shorter and pixel value 16 will be output in less time so that light emitter 21 emits light for a shorter amount of time and will therefore appear dimmer integrated over frame period 40. The reduction in pulse periods 42 is indicated in FIG. 6A by the arrows showing a decrease in the temporal length of the pulse periods 42 where T can be a time duration for the least-significant-bit pulse period 42 (e.g., where N=1 for an N-bit pixel value 16).

FIG. 6B illustrates the effect on pulse periods 42 for the example of FIG. 5. As shown in FIG. 6B, if luminance signal 12 indicates that pixel period 44 is 100% of frame period 40, the sum of pulse periods 42 can equal frame period 40 and pixel period 44. If luminance signal 12 indicates that pixel period 44 is 50% of frame period 40, the sum of pulse periods 42 (equal to pixel period 44) can be one half frame period 40 and the amount of light output in response to pixel value 16 integrated over frame period 40 likewise can be one half.

Figure 6C:
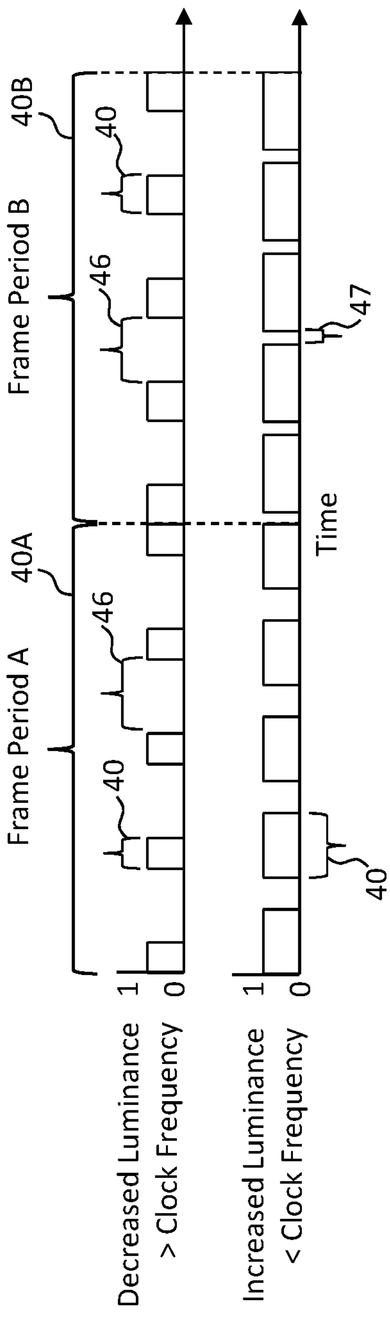
FIG. 6C is a pulse timing diagram for a pulse-density-signal according to illustrative embodiments of the present disclosure.

FIG. 6C illustrates embodiments of the present disclosure in which pixel-control signal 18 is a pulse-density-modulation signal desirably having equal-period pulses equally spaced apart in a frame period 40. Pixel value 16 is different in frame periods 40A and 40B so that pulse periods 42 are longer and blank periods 46 are shorter. In such embodiments, pixel period 44 is not fixed but pulse periods 42 can still be adjusted using changes in variable-frequency clock signal 14.

Figure 6D:
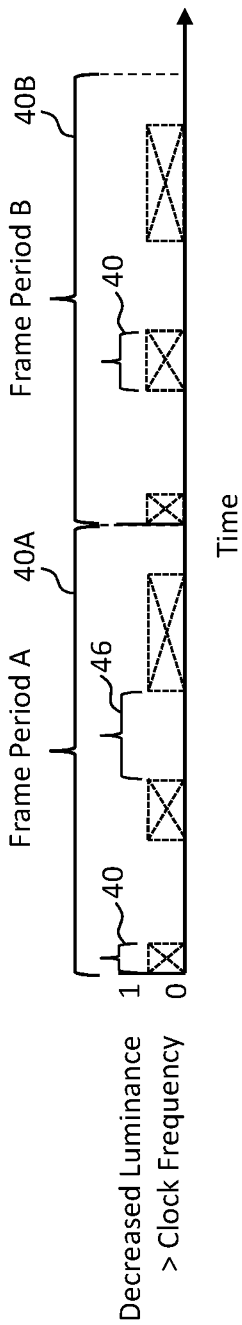
FIG. 6D is a bit timing diagrams for a pulse-density-signal according to illustrative embodiments of the present disclosure.

In FIG. 3B, blank period 46 is shown as one contiguous block of time for clarity, but in some embodiments and as shown in FIG. 6D for a pulse-width-modulation pixel-control signal 18, blank period 46 can be distributed between separate pulse periods 42 of pixel period 44 in a frame period 40, thus reducing flicker, for example similar to using pulse-density techniques.

FIG. 5 illustrates embodiments in which the shortest pulse period 42 (e.g., pulse period 42 associated with the least-significant bit of pulse value 16) is no less than the minimum pulse period 43 that can be supported by the hardware implementing system 90 and display 92. This assumption can be adequate in many realistic cases, for example in which minimum pulse period 43 is one micro-second and frame period 40 is one millisecond, and luminance signal 12 is no less than 0.1%. However, in embodiments in which least-significant bit of pulse value 16 has a pulse period 42 less than minimum pulse period 43, system 90 hardware cannot implement the desired least-significant bit pulse period 42 and pulse periods 42 must be no less than minimum pulse period 43. Similarly, for a given frame period 40, pixel period 44 cannot exceed frame period 40. In such embodiments, variable pixel period 44 is equal to luminance signal 12 times frame period 40 but can be no greater than frame period 40 and no less than a minimum pulse period 43 determined by system 90.

For example, in a software pseudo-program illustration:

```
X = (frame period * luminance signal);
IF (X < minimum pulse period) THEN (pixel
period = minimum pulse period);
ELSE IF (X > frame period) THEN (pixel period = frame period);
ELSE (pixel period = X);
```

Figure 7A:
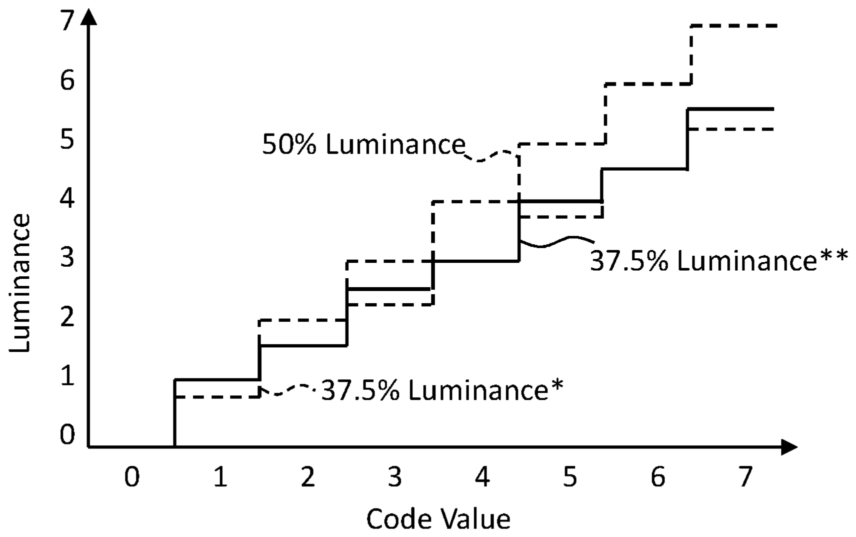
FIGS. 7A-7C are code value tables and reduced-luminance diagrams according to illustrative embodiments of the present disclosure.

In the first two cases of a desirably very dim or a desirably very bright pixel 20 light emitter 21, an alternative mapping of pixel values 16 to achievable pulse periods 42 can be used as illustrated in FIG. 7A. FIG. 7A illustrates an embodiment in which desired pulse period 42 for least-significant bit pulse period 42 is shorter than minimum pulse period 43. FIG. 7A shows the PWM pulse periods 42 for the 50% luminance signal 12 case (as also illustrated in FIGS. 5-6B) and an embodiment for a luminance signal 12 equal to 37.5% (3/8 of 100%). In this embodiment, and as shown in the table with a single asterisk '*', the desired least-significant bit pulse period 42 has a relative temporal duration of 0.75, which cannot be achieved because minimum pulse period 43 equals one. The remaining pulse periods 42 (1.5, 2.25, 3, 3.75, 4.5, and 5.25) can be achieved as they are greater than minimum pulse period 43. Therefore, in an actual implementation (shown with double asterisks ''), code value 1 (a pixel value 16 equal to one) can be rendered with either a zero or a one and the remaining code values as combinations of the achievable pulse periods 42, as shown. The graph in FIG. 7A illustrates the 50% luminance signal 12 as a reference with the top dashed line and is identical to the illustration in FIG. 5. The bottom dashed line illustrates the desired luminance for a luminance signal 12 equal to 37.5 and the solid line illustrates the actual, achievable luminance. In this example, luminance signal 12 still has eight different levels, so no additional contouring is introduced, but luminance signal 12** has some errors (differences from the desired luminance).

Figure 7B:
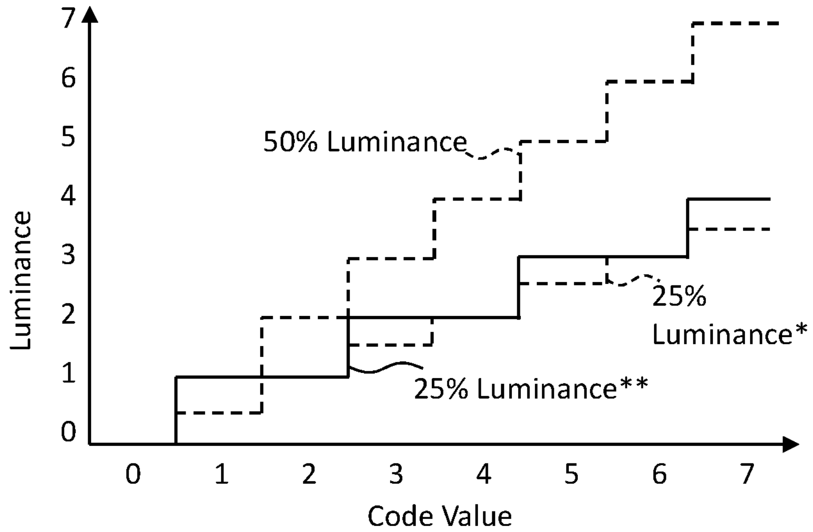

FIG. 7B illustrates an example with luminance signal 12 equal to 25%. In this embodiment, there are fewer achievable pulse periods 42 available, so more contouring is present. The available pulse periods 42 are only one and two and the luminance output is therefore limited to combinations of only one and two pulse periods 42, as shown in the actual code value assignments. FIG. 7B illustrates the result for a 50% luminance signal 12 (upper dashed line), a desired 25% luminance signal 12 (lower dashed line), and an actual 25% luminance signal 12 (solid line). The actual 25% output luminance has only five different luminance output levels.

Figure 7C:
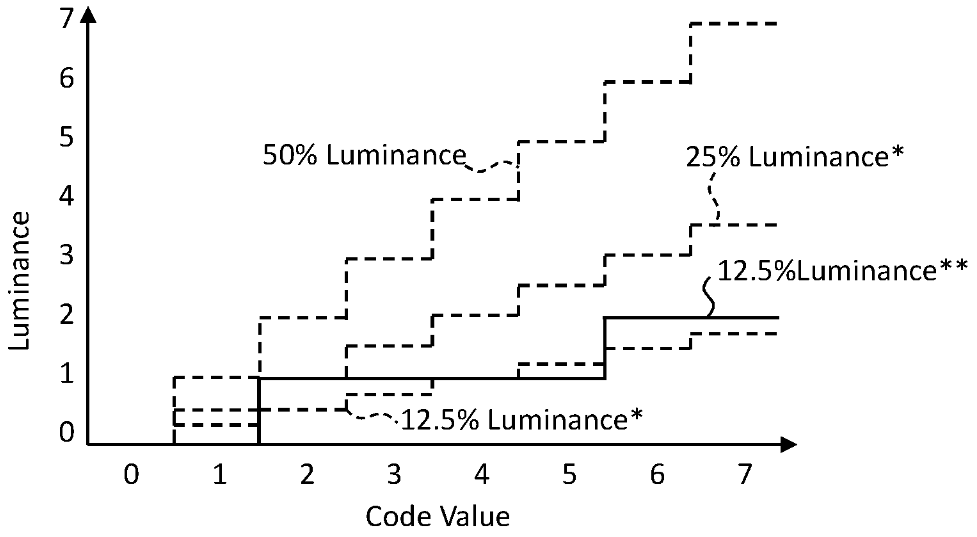

FIG. 7C illustrates an example with luminance signal 12 equal to 12.5% (⅛ luminance). In this embodiment, there are even fewer achievable pulse periods 42 available, so even more contouring is present. Only one pulse period 42 is available and the luminance output is therefore limited to combinations of only one pulse period 42, as shown in the actual code value assignments. (Different code value assignments can be used, for example rounding a desired 0.5 luminance to an actual zero luminance rather than one.) FIG. 7C illustrates the result for a 50% luminance signal 12 (upper dashed line), a desired 25% luminance signal 12 (middle dashed line), a desired 12.5% luminance signal 12 (lower dashed line), and an actual 12.5% luminance signal 12 (solid line). The actual 12.5% output luminance has only three different luminance output levels.

Figure 8:
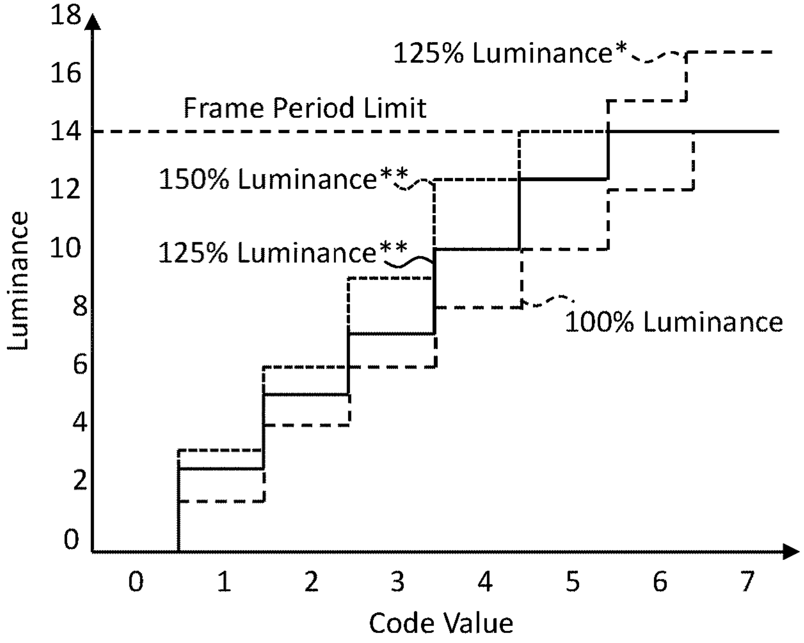
FIG. 8 is code value table and an increased-luminance diagram according to illustrative embodiments of the present disclosure.

FIGS. 7A-7C illustrate embodiments with a luminance signal 12 less than one. In some embodiments, luminance signal 12 can be greater than one. In such embodiments, the greatest luminance output cannot be exceeded (e.g., where pixel 20 and light emitter 21 are on for the entire frame period 40), but smaller code values can provide increased luminance, again with potential increases in contouring (reduction in gray scale). FIG. 8 illustrates three cases for luminance signal 12 equal to 100% (as also shown in FIG. 5) for reference, luminance signal 12 equal to 125%, and luminance signal 12 equal to 150%. The available PWM pulse periods 42 are shown and assigned to code values as illustrated in the tables. The graph shows luminance output for a luminance signal 12 of 100% (bottom dashed line, desired and actual luminance output), a luminance signal 12 of 125% (top dashed line, desired luminance output), a luminance signal 12 of 125% (solid line, actual luminance output), and a luminance signal 12 of 150% (line with small dashes, actual luminance output). The desired luminance output for a luminance signal 12 of 150% over the maximum luminance output equal to 14 is not shown. As shown, when luminance signal 12 is greater than one, the maximum luminance output does not increase (because frame period 40 is fixed) and the number of code values assigned to output light for the entire frame period 40 can increase, reducing the gray scale.

According to embodiments of the present disclosure, a system 90 and pixels 20 with dimming control using temporal modulation can reduce or increase luminance output (brightness) without changing frame period 40. In some embodiments, the luminance decreases without changing or decreasing the number of gray levels available for pixel value 16. In some embodiments having a minimum pulse period 43, the number of gray levels decreases at some desired reduced luminance. In some embodiments, the number of gray levels decreases at some desired increased luminance.

In some embodiments, pulse periods 42 have relative temporal durations that are factors of two (e.g., PWM). In some embodiments, pulse periods 42 have relative temporal durations that are substantially equal (e.g., PDM). However, in embodiments wherein light output and pulse periods 42 from system 90 and display 92 is limited by minimum pulse period 43, fewer pulse periods 42 with longer blank periods 46 can be used. Moreover, where blank period 46 are limited in duration, e.g., the time required to turn a light emitter 21 off and then on again has a minimum temporal duration (e.g., a minimum blank period 47) so that light emitters 21 cannot be turned off and then on again as quickly as can be desired, in some embodiments of the present disclosure pulse periods 42 in a modified pulse-density modulation system 90 can have different pulse period 42 temporal durations, for example as shown in frame period 40B for the increased luminance example.

In some embodiments a display 92 comprising an array of pixels 20 and a display controller 30, display controller 30 is operable to generate or receive luminance signal 12, for example from an input signal from a user of display 92 that desires to increase or decrease display 92 luminance or from an input signal provided by an ambient light sensor indicating that optimal luminance for display 92 in the ambient luminance (e.g., bright daylight or dark night) can be achieved by increasing or decreasing luminance signal 12.

In some embodiments, a display 92 comprising an array of pixels 20 comprises a display controller 30 operable to generate luminance signal 12, for example directly from an ambient light sensor, or by analyzing pixel values 16 to determine the desired relative luminance of pixels 20 and determine a range of pixel values 16 with an upper bound, or an upper bound and a lower bound, in an array of pixel values 16 (e.g., a maximum value in the range and optionally a minimum value in the range), for example by analyzing an image for display on display 92. Display controller 30 can provide luminance signal 12 in response to the determined range, upper bound, or lower bound, for example by dividing the upper bound by $2^N$ or $2^N-1$ where N is the number of bits in pixel values 16. Some embodiments can provide display 92 dimming without loss of pixel value 16 bit-depth (gray-scale resolution) while others, as discussed above can provide display 92 dimming or brightening with some reduction in pixel value 16 bit depth. Such dimming control can be provided very simply, just by modifying a clock signal 10 used to generate pixel-control signal 18.

Figure 9:
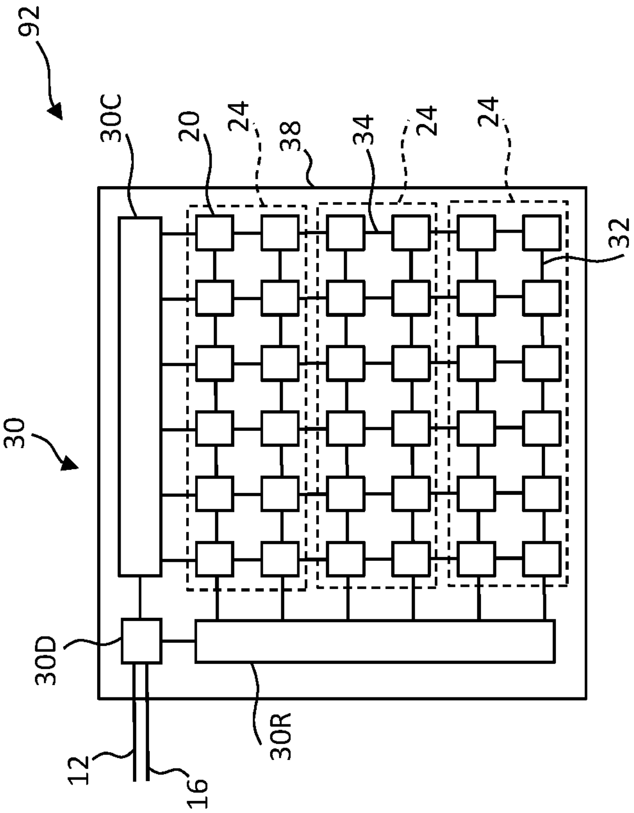
FIG. 9 is a schematic of a display with dimming zones according to illustrative embodiments of the present disclosure.

In some embodiments and as shown in FIG. 9, the array of pixels 20 can be disposed in pixel groups 24 (for example rows or columns or rectangular areas) and each pixel group 24 can receive or generate a different variable-frequency clock signal 14. If an image for display 92 has a reduced range in some areas but not in others or has different reduced ranges in the different pixel groups 24, or different ambient light conditions, the bit-depth in the different areas can be improved by using dimming control as described above for each of the different areas. Display controller 30 can determine different luminance signals 12 for different pixel groups 24 of pixels 20 and provide the different luminance signals 12, variable-frequency clock signals 14, or pixel-control signals 18 to pixels 20, for example using row or column wires 32, 34 or other signal mechanisms not illustrated in the Figures. In such embodiments, to maintain the bit depth in each group, pixel values 16 can be interpolated from the reduced range of pixel group 24 to a full bit-depth of the entire image. For example, if a lower portion of an image has pixel values 16 having an upper value of 127 (in an eight-bit system), the pixel values 16 in the lower portion can be a pixel group 24 and pixel values 16 interpolated to a range from zero to 255 and luminance signal 12 set to 50%. The luminance of pixels 20 in pixel group 24 will be the same (50% of the maximum luminance) but the number of pixel values 16 is increased from 128 to 256, decreasing contouring in the image for pixels 20 in pixel group 24. Interpolation can be linear, or arithmetic or other interpolation algorithms can be used, for example a geometric interpolation. In other embodiments wherein the image source has a greater bit-depth than the display bit depth, the additional bits from the image source can be used to provide the desired bit depth for pixel group 24 where the luminance signal 12 is less than 100% so that interpolation is not required.

Thus, in embodiments of the present disclosure, display controller 30 can be operable to (i) provide different luminance signals 12 to two or more pixel groups 24 of pixels 20 in the array of pixels 20, (ii) provide different variable-frequency clock signals 14 to one or more pixel groups 24 of pixels 20 in the array of pixels 20, or (iii) provide different pixel-control signals 18 having different pixel periods 44 to one or more pixel groups 24 of pixels 20 in the array of pixels 20.

Figure 10:
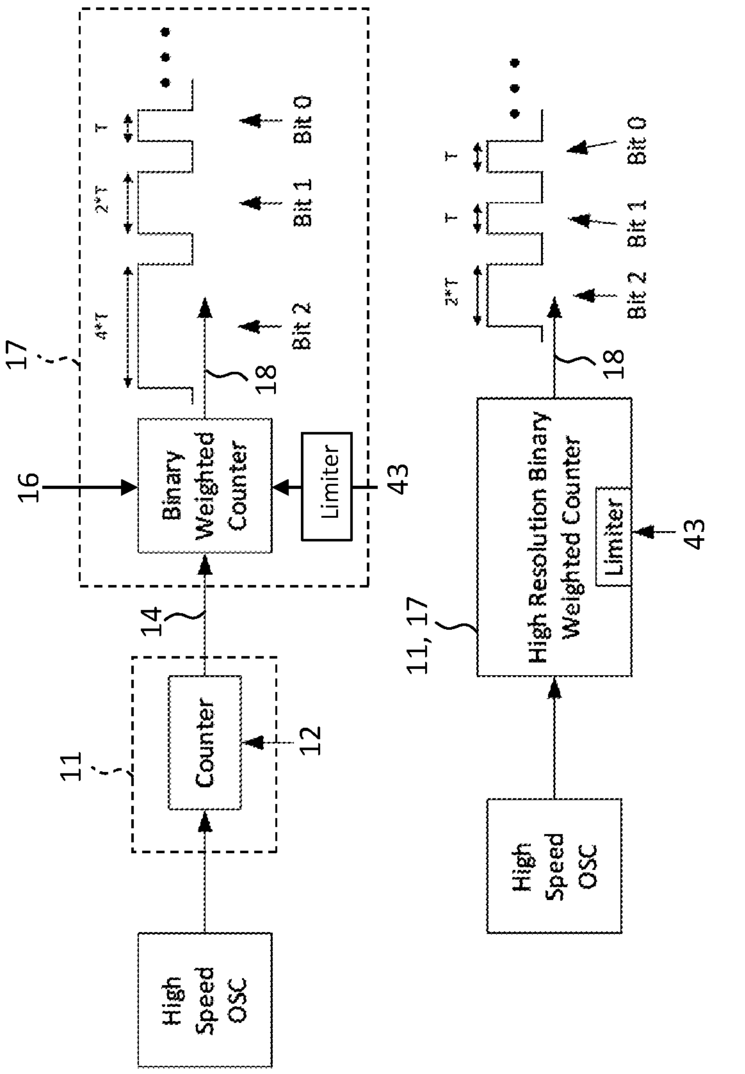
FIG. 10 is a schematic diagram of a digital variable-frequency-clock signal generator and pixel-control signal generator according to illustrative embodiments of the present disclosure.
Figure 11A:
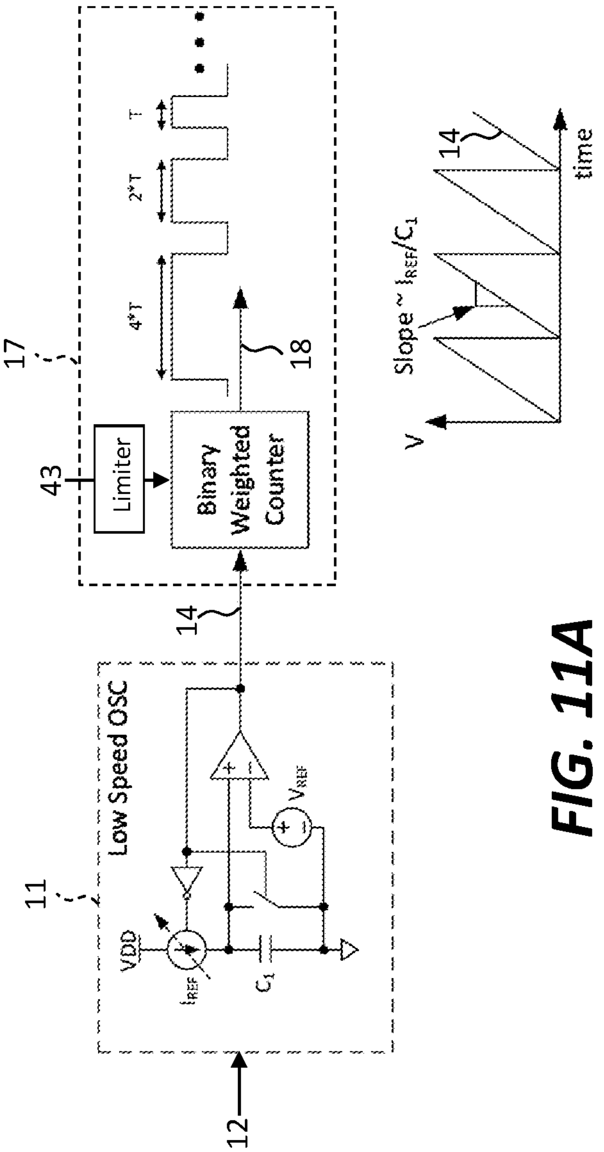
FIGS. 11A-11D are schematic diagrams of analog variable-frequency-clock signal generators according to illustrative embodiments of the present disclosure.

According to embodiments of the present disclosure, display controller 30, variable-frequency-clock signal generator 11 and pixel-control signal generator 17 can be constructed using digital, analog, or mixed signal circuits, for example provided in one or more integrated circuits. A simplified and primarily digital implementation is illustrated in FIG. 10. As shown in the upper diagram of FIG. 10, a fixed-frequency clock signal 10 can be generated by, for example, a crystal oscillator or bistable electrical circuit. Clock signal 10 frequency can be controlled by variable-frequency clock generator 11 to reduce clock signal 10 frequency to a frequency corresponding to least-significant-bit pulse period 42, responsive to luminance signal 12 and frame period 40, for example using a counter and control logic. Clock signal 10 frequency should be sufficiently large to support the range and precision (resolution) of luminance signal 12, for example to enable pulse period 42 variation in steps of, for example, 1%, 5%, 10%, 20%, or 25%. Pixel-control signal generator 17 can input variable-frequency clock signal 14 and, using a counter, generate a temporally modulated binary-weighted or pulse-density series of pulse periods 42. Pixel-control signal 18 can be generated by combining the series of pulse periods 42 with pixel value 16. Pixel-control signal generator 17 can use control logic to input minimum pulse period 43 to ensure that no pulse periods 42 have a temporal duration less than minimum pulse period 43. Minimum pulse period 43 can be established by the hardware of system 90 and can be indicated by any useful signal format. The lower diagram of FIG. 10 illustrates embodiments in which variable-frequency clock generator 11 and pixel-control signal generator 17 are combined in a common circuit. FIG. 11A illustrates embodiments using analog circuit components. As shown in the simplified circuit of FIG. 11A, a relatively low-frequency (compared to the oscillator in FIG. 10) variable oscillator circuit (e.g., a relaxation oscillator) can comprise a variable current source ($I_{REF}$) together with a capacitor, switch, and operational amplifier to provide variable-frequency clock signal 14. A relaxation oscillator is a nonlinear electronic oscillator circuit that produces a non-sinusoidal repetitive output signal, such as a triangle wave or square wave. The circuit can include (e.g., consist of) a feedback loop containing a switching device such as a transistor, comparator, relay, op amp, or a negative resistance device like a tunnel diode, that repetitively charges a capacitor or inductor through a resistance until it reaches a threshold level, then discharges it again. The period of the oscillator depends on the time constant of the capacitor or inductor circuit. The active device switches abruptly between charging and discharging modes, and thus produces a discontinuously changing repetitive waveform. As shown in the graph, the slope (and therefore the frequency) of variable-frequency clock signal 14 can be controlled with variable-frequency-clock signal generator 11 by adjusting $I_{REF}$ with respect to the capacitor. Variable-frequency clock signal 14 then drives a digital circuit, for example driving a binary-weighted counter such as a counter with binary output lines to generate pixel-control signal 18.

Figure 11B:
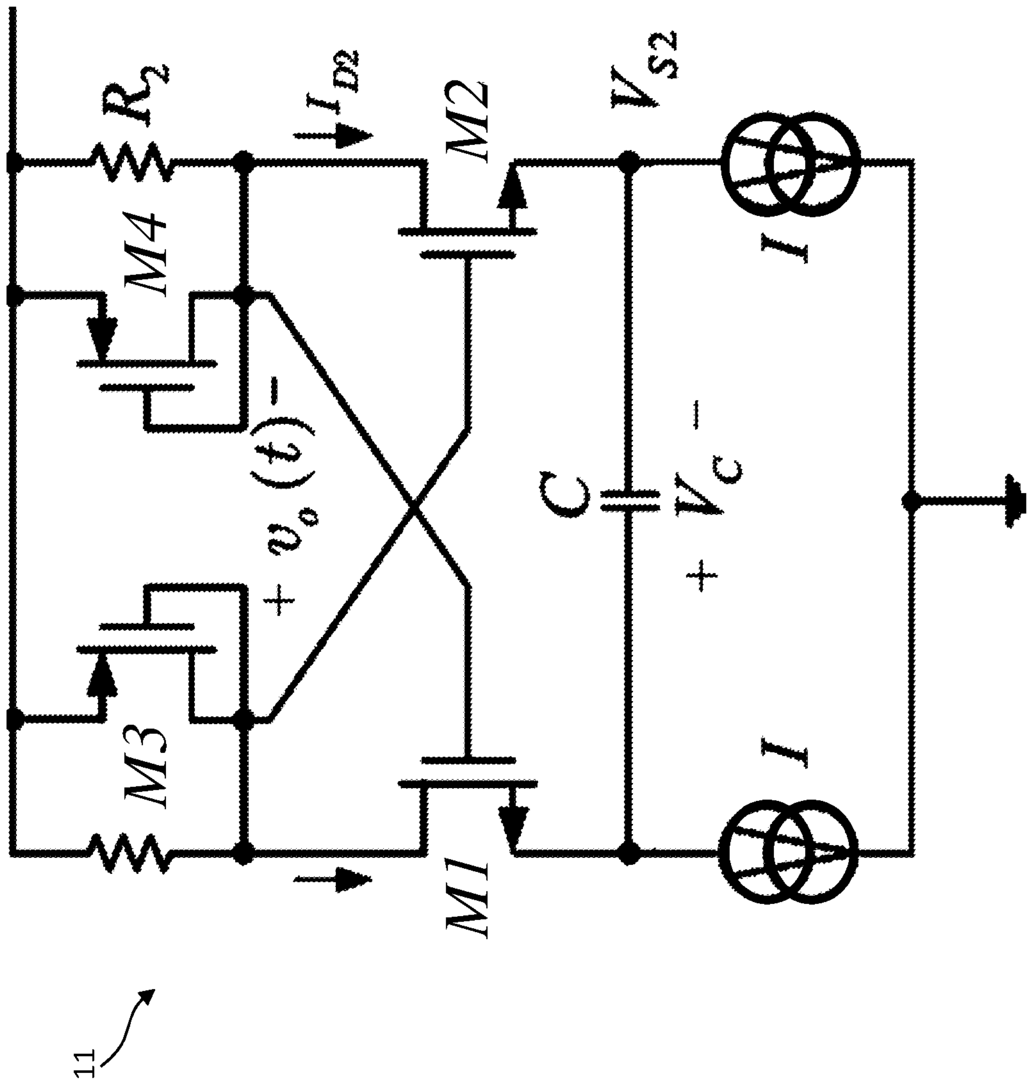
Figure 11C:
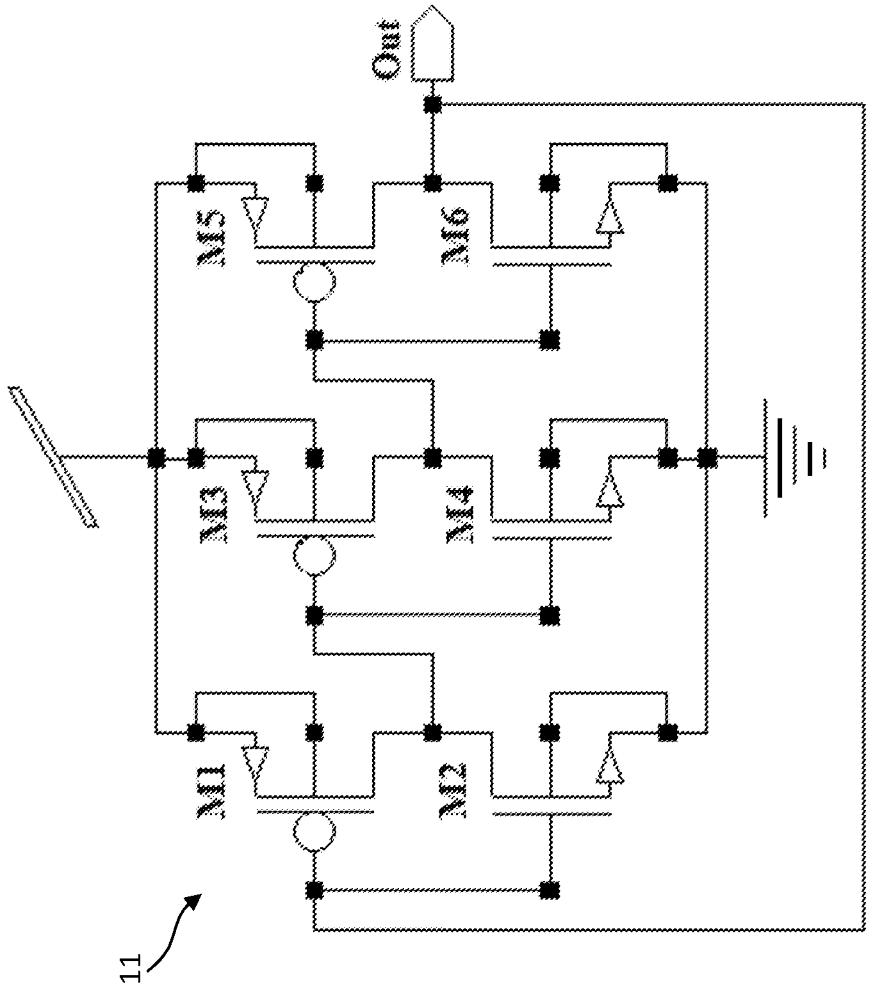
Figure 11D:
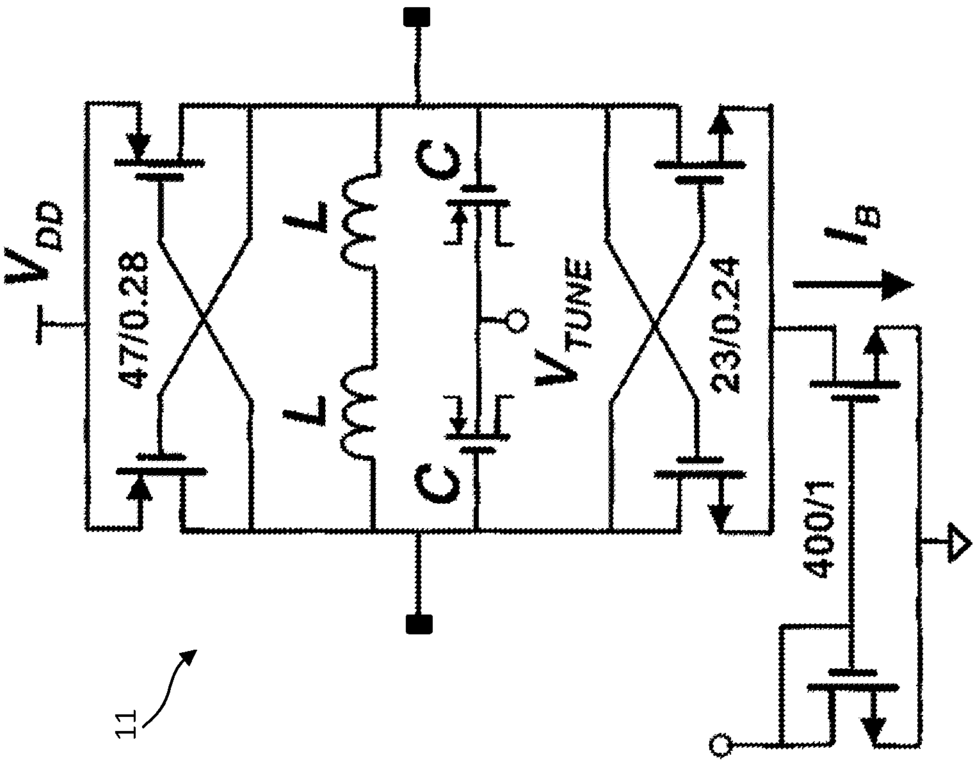

FIG. 11B shows an alternative relaxation oscillator according to embodiments of the present disclosure. FIG. 11C illustrates embodiments of a variable-frequency clock signal generator 11 comprising a ring oscillator. In such a circuit, a variable voltage responsive to luminance signal 12 converted to a current for the current source can generate variable-frequency clock signal 14. FIG. 11D illustrates embodiments comprising an LC circuit in which $V_{TUNE}$ is responsive to luminance signal 12 to generate variable-frequency clock signal 14. As shown in FIGS. 11A-11D, a variety of circuits can be used to provide variable-frequency-clock signal generator 11.

Figure 12:
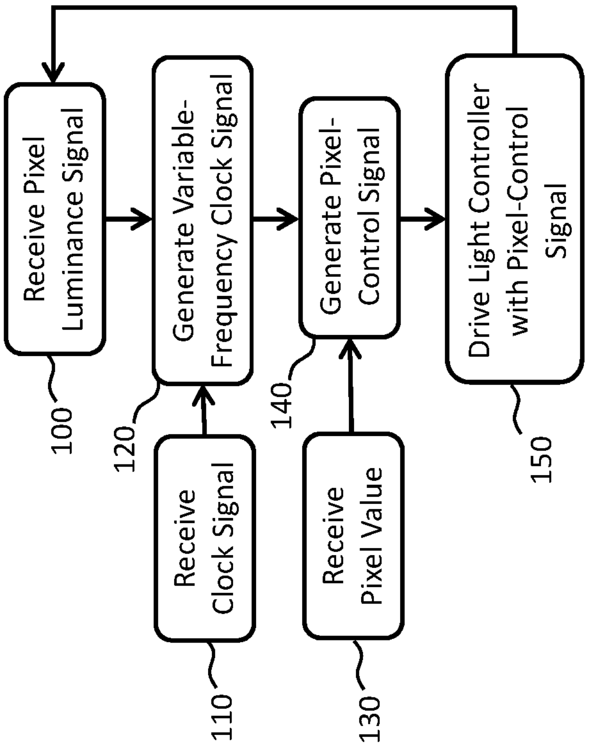
FIG. 12 is a flow diagram according to illustrative embodiments of the present disclosure.

As shown in FIG. 12, methods of operating pixel 20 with dimming control can comprise, receiving a luminance signal 12 in step 100, receiving clock signal 10 in step 110, and generating a variable-frequency clock signal 14 responsive to luminance signal 12 and clock signal 10 in step 120, for example using variable-frequency-clock signal generator 11. Pixel-control signal generator 17 can receive pixel value 16 in step 130 and generate pixel-control signal 18 in response to variable-frequency clock signal 14 in step 140. Pixel 20 can receive pixel-control signal 18 and drive light controller 21 with pixel-control signal 18 in step 150. The process can then repeat as long as system 90 or display 92 are in use. If a first luminance signal 12 is greater than a second, subsequent luminance signal 12, the frequency of a first variable-frequency clock signal 14 can be less than the frequency of a second variable-frequency clock signal, 14. If the first luminance signal 12 is less than the second luminance signal 12, the frequency of the first variable-frequency clock signal 14 can be greater than the frequency of the second variable-frequency clock signal 14.

One or more of display controller 30, variable-frequency-clock signal generator 11, pixel-control signal generator 17, and pixel controller 22 (circuits) can be digital or mixed-signal circuits provided in one or more integrated circuits (e.g., silicon integrated circuits) and disposed on a display substrate 38 (shown in FIGS. 4 and 9) or on a pixel substrate (not shown in the Figures) disposed on a display substrate 38. Any of the circuits can be native to a display substrate 38, native to a pixel substrate, or provided in integrated circuits disposed on and non-native to a display substrate 38 or a pixel substrate, for example by micro-transfer printing. Light controller 21 can likewise be disposed on a display substrate 38 or on a pixel substrate and can be non-native to either or both. Such integrated circuits can be provided in bare, unpackaged die and micro-transfer printed from source wafers to a desired target substrate (e.g., a display substrate 38 or pixel module substrate) and therefore comprise broken (e.g., fractured) or separated tethers. Similarly, light controllers 21 such as inorganic light emitting diodes (LEDs) can be transferred from LED source wafers to a desired target substrate (e.g., a display substrate 38 or pixel module substrate) and can also comprise broken (e.g., fractured) or separated tethers. Bare-die integrated circuits disposed on a display substrate 38 or on a pixel module substrate can be electrically connected using photolithographic or printed-circuit board methods and materials. Signals transmitted between integrated circuits or within an integrated circuit and to light controller 21 can be electrically conductive thin-film wires (e.g., metal wires comprising row wires 32 or column wires 34) photolithographically defined on a display substrate 38, pixel substrate, or in integrated circuits. Power and ground signals can be provided on wires to pixel controller 22 or display controller 30 to operate pixel controller 22 and light controller 21.

Pixels 20 can comprise multiple light controllers 21, for example emitting different colors of light, and each light controller 21 can be responsive to a different pixel value 16. Pixel-control signal generator 17 can apply a common variable-frequency clock signal 14 to generate different pixel-control signals 18 for each light controller 21 in pixel 20.

In some embodiments, a different variable pixel period 44 can be used for each different light controller 21. For example, displays are frequently adjusted to desired white points (e.g., D6500) that specify the combination of light emitted from different light-controller 21 (e.g., red, green, and blue). Different amounts of each color can be applied by system 90 to every pixel value 16 of pixel 20 by adjusting the pixel period 44 applied to each color of light controller 21 without reducing the available gray scale for each color.

Light controllers 21 can be light-emitting diodes (e.g., inorganic light emitting diodes or organic light-emitting diodes) that can switch very rapidly between an on-state and an off-state (e.g., within a few micro-seconds, one micro-second, or less than a micro-second) in response to a digital control signal such as pixel-control signal 18 (e.g., either on at a fixed voltage and constant current emitting light or off and not emitting light at, for example, zero volts). The human visual system averages the light emitted during pulse periods 42 in each frame period 40 (e.g., display image frame) to perceive an average brightness during frame period 40, if the pulses are sufficiently fast and short. In contrast, light emitters in displays driven by a variable voltage or variable current displays are on for the entire display frame but at a brightness dependent on the voltage or current supplied to the light emitters. Light-emitting diodes can have variable efficiency depending on the voltage or current supplied; thus light-emitting diodes driven at a constant current and voltage for variable amounts of time specified by temporal bits P, and according to embodiments of the present disclosure, can be more power efficient by operating at or near peak efficiency during the temporal pulse periods 42.

Display 92 can be a flat-panel display, for example an organic light-emitting diode display, an inorganic light-emitting diode display, or a liquid crystal display. In some embodiments, switching frequencies are limited, for example by electronic devices and connections, or by switching frequencies for the light controllers 21, for example liquid crystal displays that can have liquid crystal switching times in the tens of milliseconds. In such displays, systems 90 and pixels 20 can provide improved image frame rates and gray-scale resolution with dimming control.

Pixel-control signal generator 17 can comprise an effectively binary digital switch fed by a constant-current supply because it does not continuously modulate the amount of current supplied by the constant-current supply but rather operates in a first mode in which light controller 21 is turned off (e.g., at a zero voltage) and no current flows through light controller 21 and a second mode in which the current flows through light emitter 21 at a constant current specified by the constant-current supply and non-zero voltage specified by pixel-control signal 18. Thus, the voltage and current supplied to light controllers 21 is digital and binary (e.g., has two levels including zero).

Certain embodiments of the present disclosure can be applied to, or are, active-matrix displays 92. For example, display control signals from display controller 30 can comprise a row-control signal provided on a row wire 32 and a column-data signal provided on a column wire 34 and electrically connected to an array of pixels 20 arranged in rows and columns on a display substrate 38 in an active-matrix display 92. Each pixel 20 can comprise one or multiple light controllers 21, each of which can comprise, for example, a micro-inorganic-light-emitting diode. Each of multiple light controllers 21 in a pixel 20 can be or include a different inorganic light-emitting diode 21 that emits a different color of light when provided with electrical current at a suitable voltage.

According to some embodiments of the present disclosure, the circuits (e.g., any one or more of display controller 30, variable-frequency-clock signal generator 11, pixel-control signal generator 17, and pixel controller 22) can comprise any of a variety of transistors, for example transistors such as those known in the electronics, integrated circuit, and display industries. Transistors can be thin-film transistors (TFTs), for example amorphous transistors or polysilicon transistors and can be a semiconductor thin-film circuit formed on a substrate, such as a display substrate 38. In some embodiments, transistors are crystalline silicon or compound semiconductor transistors, for example made in an integrated circuit process with a substrate independent from display substrate 38 and can be transfer printed onto a display substrate 38 or onto a pixel module substrate that is transfer printed onto display substrate 38. Such transfer-printed structure can comprise fractured or separated tethers.

According to some embodiments of the present disclosure, light controllers 21 are micro-inorganic-light-emitting diodes (micro-iLEDs) with at least one of a width and a length that is no greater than 500 microns (e.g., no greater than 200 microns, no greater than 100 microns, no greater than 50 microns, no greater than 25 microns, no greater than 15 microns, no greater than 12 microns, no greater than 8 microns, or no greater than 5 microns). Micro-LEDs provide an advantage according to some embodiments of the present disclosure since they are sufficiently small and can be disposed spatially close together so that the different micro-LEDs in a pixel 20 cannot be readily distinguished by the human visual system in a display at a desired viewing distance, improving color mixing of light emitted by pixel 20 and providing apparent improvements in display resolution. Embodiments of the present disclosure can be constructed using micro-transfer printing.

Methods of forming useful micro-transfer printable structures are described, for example, in the paper *AMOLED Displays using Transfer-Printed Integrated Circuits, Journal of the SID,* 19(4), 2012, and U.S. Pat. No. 8,889,485. For a discussion of micro-transfer printing techniques see, U.S.

Pat. Nos. 8,722,458, 7,622,367 and 8,506,867, the disclosures of which are hereby incorporated by reference in their entirety. Micro-transfer printing using compound micro-assembly structures and methods can also be used with the present disclosure, for example, as described in U.S. patent application Ser. No. 14/822,868, filed Aug. 10, 2015, entitled Compound Micro-Assembly Strategies and Devices, the disclosure of which is hereby incorporated by reference in its entirety. In some embodiments, pixels 20 are compound micro-assembled devices.

As is understood by those skilled in the art, the terms "over" and "under", "above" and "below", and "top" and "bottom" are relative terms and can be interchanged in reference to different orientations of the layers, elements, and substrates included in the present invention. For example, a first layer on a second layer, in some implementations means a first layer directly on and in contact with a second layer. In other implementations a first layer on a second layer includes a first layer and a second layer with another layer therebetween.

Throughout the description, where apparatus and systems are described as having, including, or comprising specific components, or where processes and methods are described as having, including, or comprising specific steps, it is contemplated that, additionally, there are apparatus, and systems of the disclosed technology that consist essentially of, or consist of, the recited components, and that there are processes and methods according to the disclosed technology that consist essentially of, or consist of, the recited processing steps.

It should be understood that the order of steps or order for performing certain action is immaterial so long as operability is maintained. Moreover, two or more steps or actions in some circumstances can be conducted simultaneously.

Having expressly described certain embodiments, it will now become apparent to one skilled in the art that other embodiments incorporating the concepts of the disclosure may be used. Therefore, the claimed invention should not be limited to the described embodiments, but rather should be limited only by the spirit and scope of the following claims.

PARTS LIST

10 clock signal
11 variable-frequency-clock signal generator
12 luminance signal
14 variable-frequency clock signal
15 PWM generation
16 pixel value
17 pixel-control signal generator
18 pixel-control signal
20 pixel
21 light emitter/light controller/light-emitting diode
22 pixel controller
24 pixel group
30 display controller
30D central controller
30C column controller
30R row controller
32 row wire
34 column wire
38 display substrate
40, 40A, 40B frame period
42 pulse period
43 minimum pulse period
44 pixel period
46 blank period
47 minimum blank period
90 system with dimming control
92 display with dimming control
100 receive pixel luminance signal step
110 receive clock signal step
120 generate variable-frequency clock signal step
130 receive pixel value step
140 generate pixel-control signal step
150 drive light-controller with pixel-control signal step

The invention claimed is:

1. A system with dimming control, comprising:
a variable-frequency-clock signal generator responsive to a luminance signal operable to generate a variable-frequency clock signal that is regular within a frame period;
a pixel-control signal generator responsive to the variable-frequency clock signal and operable to generate a pixel-control signal, wherein the pixel-control signal is a temporally modulated signal comprising pulse periods corresponding to a pixel value; and
a pixel comprising a light controller responsive to the pixel-control signal,
wherein each of the pulse periods is a multiple of a period of the variable-frequency clock signal within the frame period.

2. The system of claim 1, wherein the variable-frequency-clock signal generator is operable to change a frequency of the variable-frequency clock signal in response to the luminance signal.

3. The system of claim 2, wherein the variable-frequency-clock signal generator is operable to increase the frequency of the variable-frequency clock signal in response to the luminance signal to reduce luminance of the light controller and the variable-frequency-clock signal generator is operable to decrease the frequency of the variable-frequency clock signal in response to the luminance signal to increase luminance of the light controller.

4. The system of claim 1, comprising an array of pixels, each of the pixels comprising a light controller responsive to a pixel-control signal from a pixel-control signal generator.

5. The system of claim 1, comprising a display controller, wherein the display controller comprises the variable-frequency-clock signal generator and the pixel-control signal generator.

6. The system of claim 1, comprising a display controller, wherein the display controller comprises the variable-frequency-clock signal generator and the pixel comprises the pixel-control signal generator.

7. The system of claim 1, comprising a display controller, wherein the display controller is operable to provide the luminance signal and the pixel comprises the variable-frequency-clock signal generator and the pixel-control signal generator.

8. The system of claim 1, wherein the temporally modulated signal is a constant-current time-modulation signal comprising pulse periods.

9. The system of claim 8, wherein the pulse periods correspond to binary-weighted bits that specify a pixel value corresponding to a desired light-emitter luminance.

10. The system of claim 1, wherein each of the pulse periods has a relative temporal duration responsive to a relative value of the luminance signal.

11. The system of claim 1, wherein each of the pulse periods has a relative temporal duration responsive to a relative period of the variable-frequency clock signal.

12. A display with dimming control, comprising:

an array of pixels each comprising a light controller responsive to a pixel-control signal;

for each of the pixels, a variable-frequency-clock signal generator responsive to a luminance signal operable to generate a variable-frequency clock signal that is regular within a frame period;

for each of the pixels, a pixel-control signal generator responsive to the variable-frequency clock signal operable to generate the pixel-control signal, wherein the pixel-control signal is a temporally modulated signal having a minimum temporal control period; and a display controller operable to receive or generate the luminance signal for each of the pixels, wherein each of the pulse periods is a multiple of a period of the variable-frequency clock signal within the frame period.

13. The display of claim 12, wherein (i) the display controller comprises the variable-frequency-clock signal generator for each of the pixels and each of the pixels comprises a respective pixel-control signal generator, (ii) each of the pixels comprises a respective pixel-control signal generator and comprises a respective variable-frequency-clock signal generator, or (iii) the display controller comprises the variable-frequency-clock signal generator and a respective pixel-control signal generator for each of the pixels in the array of pixels.

14. A system with dimming control, comprising:

a variable-frequency-clock signal generator responsive to a luminance signal operable to generate a variable-frequency clock signal;

a pixel-control signal generator responsive to the variable-frequency clock signal operable to generate a pixel-control signal, wherein the pixel-control signal is a temporally modulated signal; and a pixel comprising a light controller responsive to the pixel-control signal, wherein the system is operable to display a specified luminance with the light controller in a frame period, the luminance signal is a percent of the frame period, the pixel-control signal has a variable pixel period, and the variable pixel period is equal to the luminance signal times the frame period but no greater than the frame period and no less than a minimum pulse period determined by the system.

15. The system of claim 14, wherein the pixel comprises multiple light controllers and the system provides each of the light controllers with a different variable pixel period.

16. A system with dimming control, comprising:

a variable-frequency-clock signal generator responsive to a luminance signal operable to generate a variable-frequency clock signal;

a pixel-control signal generator responsive to the variable-frequency clock signal operable to generate a pixel-control signal, wherein the pixel-control signal is a temporally modulated signal; and a pixel comprising a light controller responsive to the pixel-control signal, wherein the temporally modulated signal is a constant-current time-modulation signal comprising pulse periods, wherein the pulse periods correspond to binary-weighted bits that specify a pixel value corresponding to a desired light-emitter luminance, and wherein (i) the binary-weighted bits comprise N bits, (ii) each pulse period has a relative temporal duration corresponding to a relative value of a different bit of the binary-weighted bits, and (iii) a least-significant-bit pulse period has a temporal duration equal to a (frame period times the luminance signal)/($2^N-1$).

17. The system of claim 16, wherein a minimum pulse period is greater than the least-significant-bit pulse period.

18. The system of claim 16, wherein a minimum pulse period is no greater than the least-significant-bit pulse period and all of the pulse periods have temporal durations that are substantially equal.

19. The system of claim 16, wherein a minimum pulse period is no greater than a least-significant-bit pulse period and at least two of the pulse periods have temporal durations that are substantially different and are not a relative power of two.

20. A system with dimming control, comprising:

a variable-frequency-clock signal generator responsive to a luminance signal operable to generate a variable-frequency clock signal;

a pixel-control signal generator responsive to the variable-frequency clock signal operable to generate a pixel-control signal, wherein the pixel-control signal is a temporally modulated signal; and a pixel comprising a light controller responsive to the pixel-control signal, wherein the temporally modulated signal is a constant-current time-modulation signal comprising pulse periods, wherein the pulse periods correspond to binary-weighted bits that specify a pixel value corresponding to a desired light-emitter luminance, and wherein (i) the binary-weighted bits comprise N bits and (ii) each of the pulse periods has a relative temporal duration equal to a (frame period times the luminance signal) divided by the pixel value.

21. The system of claim 20, wherein the pixel is operable to control the light emitter at a constant current during each of the pulse periods.

* * * * *